US009278476B2

(12) United States Patent
Sato et al.

(10) Patent No.: US 9,278,476 B2
(45) Date of Patent: Mar. 8, 2016

(54) BLOW MOLDING DEVICE AND BLOW MOLDING METHOD

(71) Applicant: NISSEI ASB MACHINE CO., LTD., Nagano (JP)

(72) Inventors: Koichi Sato, Ueda (JP); Atsushi Sakurai, Tomi (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 377 days.

(21) Appl. No.: 13/857,870

(22) Filed: Apr. 5, 2013

(65) Prior Publication Data

US 2013/0241118 A1 Sep. 19, 2013

Related U.S. Application Data

(63) Continuation of application No. PCT/JP2011/072371, filed on Sep. 29, 2011.

(30) Foreign Application Priority Data

Oct. 8, 2010 (JP) .................................. 2010-228910

(51) Int. Cl.
*B29C 49/30* (2006.01)
*B29C 49/42* (2006.01)
(Continued)

(52) U.S. Cl.
CPC ............. *B29C 49/30* (2013.01); *B29C 49/4215* (2013.01); *B29C 49/649* (2013.01); *B29C 49/06* (2013.01); *B29C 49/4236* (2013.01); *B29C 49/48* (2013.01); *B29C 49/56* (2013.01); *B29C 49/6409* (2013.01); *B29C 2049/024* (2013.01);
(Continued)

(58) Field of Classification Search
None
See application file for complete search history.

(56) References Cited

U.S. PATENT DOCUMENTS 5,643,619 A * 7/1997 Oas et al. ...................... 425/534
5,744,176 A * 4/1998 Takada et al. ................. 425/526
(Continued)

FOREIGN PATENT DOCUMENTS

EP 2633976 A1 9/2013
EP 2749398 A1 7/2014
(Continued)

OTHER PUBLICATIONS

International Search Report dated May 6, 2015 for International application No. PCT/JP2011072371.
(Continued)

*Primary Examiner* — Monica Huson
(74) *Attorney, Agent, or Firm* — David L. Hoffman; Hoffman Patent Group

(57) ABSTRACT

The blow molding device includes a heating section that continuously transfers and heats preforms that respectively include a neck along a heating transfer path while supporting the preforms using transfer members in an inverted state, a blow molding section that simultaneously blow-molds N (N is an integer equal to or larger than 2) preforms that have been heated by the heating section in an upright state to form N containers, and an intermittent transfer section that intermittently transfers the N preforms from the heating section to the blow molding section. The intermittent transfer section includes a pitch conversion section that converts the arrangement pitch of the N preforms from a first pitch P1 to a second pitch P2 (P2>P1), and an inversion section that includes N inversion arms that respectively invert the N preforms from the inverted state to the upright state.

12 Claims, 18 Drawing Sheets

(51) Int. Cl.
  *B29C 49/48* (2006.01)
  *B29C 49/64* (2006.01)
  *B29C 49/56* (2006.01)
  *B29L 31/00* (2006.01)
  *B29C 49/06* (2006.01)
  *B29C 49/02* (2006.01)

(52) U.S. Cl.
  CPC . *B29C2049/4221* (2013.01); *B29C 2049/4892* (2013.01); *B29C 2049/563* (2013.01); *B29L 2031/716* (2013.01)

(56) References Cited

U.S. PATENT DOCUMENTS

| | | | | |
|---|---|---|---|---|
| 5,753,279 | A | * | 5/1998 | Takada et al. ............ 425/526 |
| 5,863,571 | A | * | 1/1999 | Santais et al. ............ 425/526 |
| 5,902,612 | A | * | 5/1999 | Ogihara ................... 425/526 |
| 6,019,933 | A | * | 2/2000 | Takada et al. ............ 264/532 |
| 6,241,939 | B1 | * | 6/2001 | Takada et al. ............ 264/535 |
| 6,247,916 | B1 | * | 6/2001 | Takada et al. ............ 425/526 |
| 6,457,967 | B1 | | 10/2002 | Suzuki et al. |
| 7,727,454 | B2 | | 6/2010 | Freire-Diaz et al. |
| 2006/0099294 | A1 | * | 5/2006 | Netsu ...................... 425/540 |
| 2009/0081326 | A1 | | 3/2009 | Adriansens et al. |

FOREIGN PATENT DOCUMENTS

| | | |
|---|---|---|
| JP | B-53-022096 | 7/1978 |
| JP | A-11-170352 | 6/1999 |
| JP | A-2000-117821 A | 4/2000 |
| JP | A-2002-361723 A | 12/2002 |
| JP | A-2007-276327 A | 10/2007 |
| JP | A-2008-012737 A | 1/2008 |
| JP | A-2008-543619 A | 12/2008 |
| JP | A-2009-126129 A | 11/2009 |
| JP | A-2010-149460 A | 8/2010 |

OTHER PUBLICATIONS

Extended European Search Report dated May 6, 2015 for EPC Patent Application No. 11830552.3.

* cited by examiner

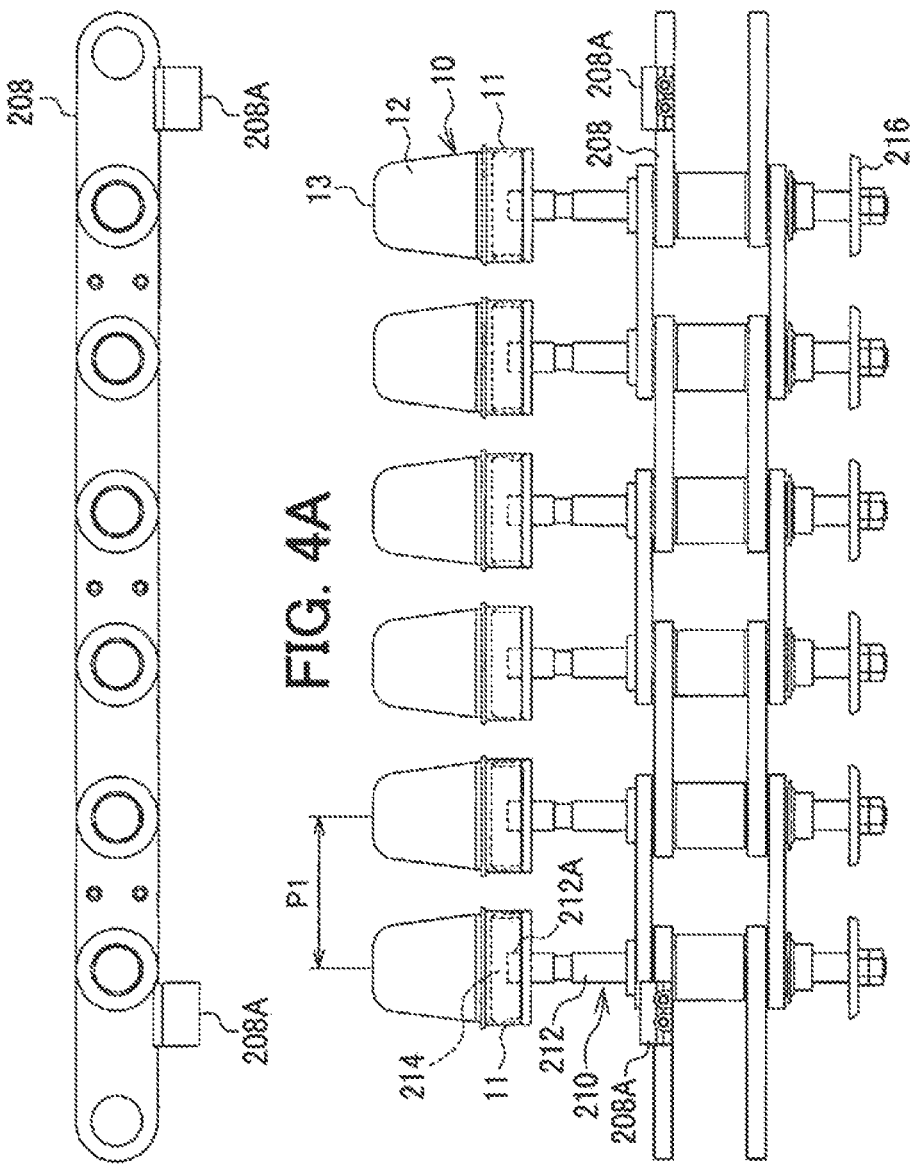

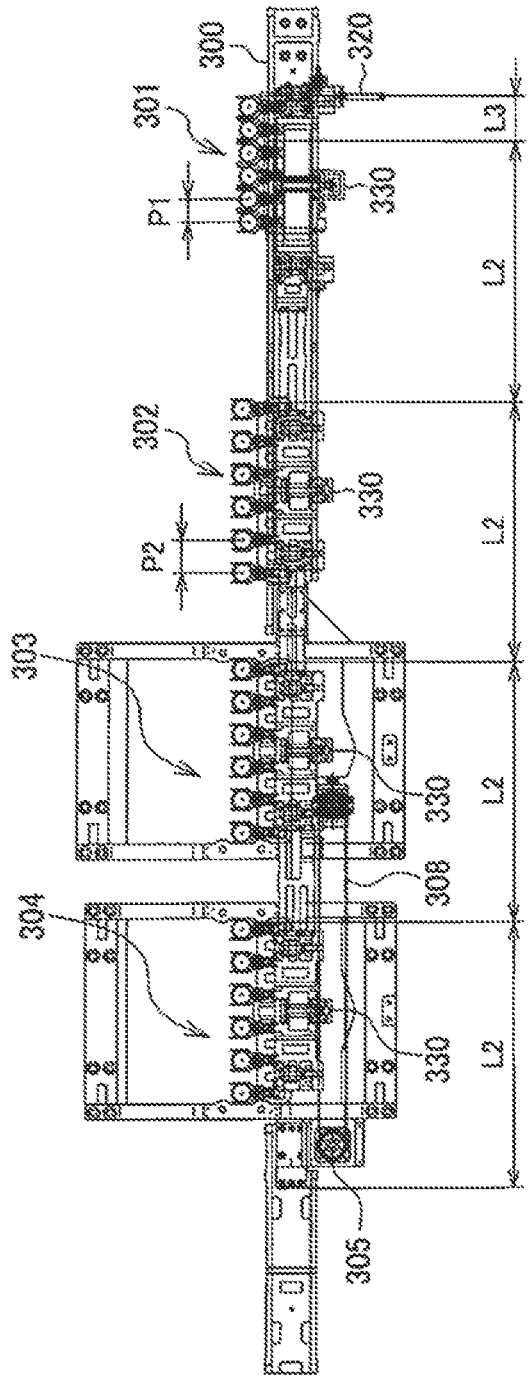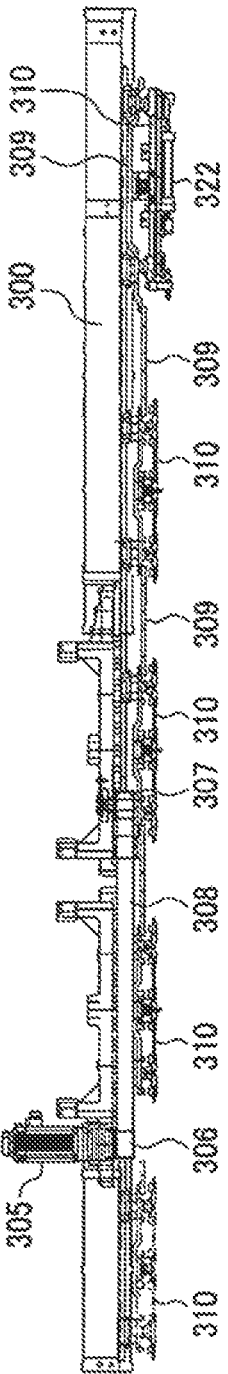

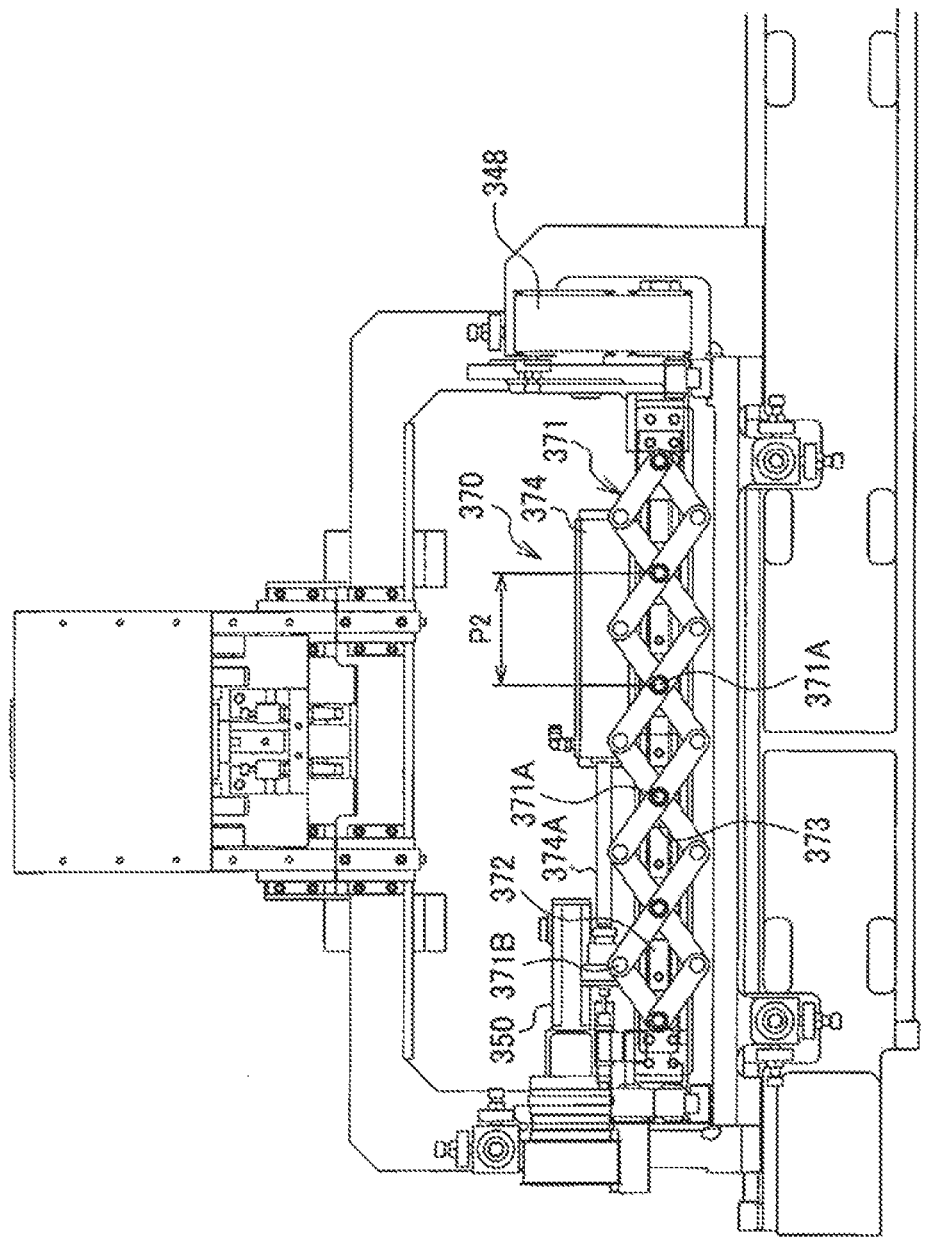

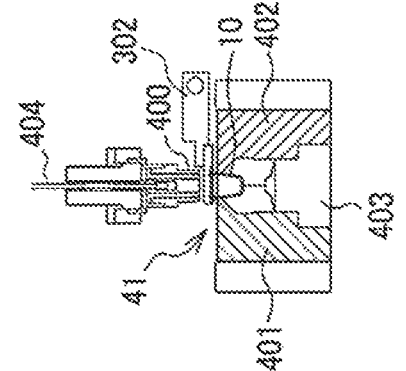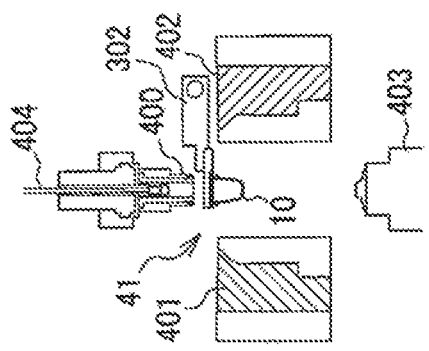

BLOW MOLDING DEVICE AND BLOW MOLDING METHOD

CROSS REFERENCE TO RELATED APPLICATIONS

This application is a continuation of International Patent Application No. PCT/JP2011/072371, having an international filing date of Sep. 29, 2011, which designated the United States and which claims priority from Japanese Patent Application No. 2010-228910 filed on Oct. 8, 2010, the entirety of both of which are incorporated herein by reference.

BACKGROUND

1. Field of the Invention

The present invention relates to a two-stage blow molding device and a two-stage blow molding method that heat a supplied preform, and blow-mold the preform into a container.

2. Description of the Related Art

A cold parison or two-stage system includes a blow molding device separately from a preform injection molding device. A preform (parison) that has been injection-molded by the injection molding device, and cooled to room temperature is supplied to the blow molding device. The blow molding device is configured so that the supplied preform is heated to the optimum blow temperature using a heating section, and blow-molded into a container using a blow molding section. The preform is continuously transferred by the heating section, and N (N is an integer equal to or larger than 2) preforms are intermittently transferred from the heating section to the blow molding section. The blow molding section simultaneously blow-molds the N preforms into N containers.

U.S. Pat. No. 7,727,454, JP-A-2000-117821, and JP-A-2007-276327 disclose a two-stage blow molding device. In U.S. Pat. No. 7,727,454 and JP-A-2000-117821, the preform is heated in an upright state in which the opening of the preform is positioned on the upper side, and the preform in the upright state is blow-molded into a container. In JP-A-2007-276327, the preform is heated in an inverted state in which the opening of the preform is positioned on the lower side, and the preform in the inverted state is blow-molded into a container. In U.S. Pat. No. 7,727,454, JP-A-2000-117821, and JP-A-2007-276327, the preform heating pitch is set to be smaller than the blow molding pitch, and the pitch is converted between the heating section and the blow molding section.

In JP-A-2000-117821 and JP-A-2007-276327, the preform is transferred between the heating section and the blow molding section by transferring a preform carrier that holds the preform. The preform carrier that has become empty is returned to the heating section, and provided with a new preform. In JP-A-2000-117821, a blow molding operation is performed in a state in which the preform carrier is positioned in an upper transfer path having a blow molding position, and inverted using an inversion device, and the empty preform carrier is returned to the heating section through a lower transfer path. In the heating section, a new preform is supplied to the inverted preform carrier. The preform carrier is then inverted using an inversion device, and the preform is heated in the upright state.

A hot parison or one-stage blow molding device is configured so that N preforms that have been injection-molded by an injection molding section are blow-molded into N containers in a state in which the preforms retain heat applied during injection molding. As disclosed in JP-B-53-22096, a typical blow molding device is configured so that an injection molding section, a temperature control section, a blow molding section, and an ejection section are provided at four positions of a turntable, and a preform or a container is rotated using a neck mold. In this case, a preform that has been injection-molded in the upright state is transferred and blow-molded in the upright state. The one-stage system is characterized in that the number of preforms that are simultaneously injection-molded coincides with the number of preforms that are simultaneously blow-molded.

The two-stage blow molding device may heat a preform in the upright state (see U.S. Pat. No. 7,727,454 and JP-A-2000-117821). In this case, since the number of transfer members for which the structure becomes complex increases as a result of continuously transferring the preform in the upright state using the heating section, the cost of the device necessarily increases. In the heating section, a plurality of rod-like heaters that extend along the preform transfer path are disposed at a different height. Since the body of the preform in the upright state decreases in diameter (i.e., is tapered) toward the bottom thereof, the preform may be uniformly heated by disposing the lower rod-like heater close to the center of the transfer path as compared with the upper rod-like heater. In this case, if the preform that is transferred in the heating section falls by accident, the preform is necessarily caught by the lower rod-like heater. Such a situation is dangerous. Therefore, the device disclosed in U.S. Pat. No. 7,727,454 or JP-A-2000-117821 that heats a preform in the upright state is not suitable for a preform (e.g., wide-mouth preform) that is formed so that the body decreases in diameter (i.e., is tapered) toward the bottom.

The above problem does not occur when using the device disclosed in JP-A-2007-276327 in which a preform is heated in the inverted state. It may be advantageous to blow-mold a preform in the inverted state into a container in the inverted state from the viewpoint of preform transfer. However, placement of equipment may become difficult from the viewpoint of blow molding since a drive mechanism for inserting a blow core mold or a stretching rod into the downward opening of the preform significantly occupies the space inside the stage. Therefore, a relatively large clamping mechanism that opens/closes and clamps a heavy blow mold and/or bottom mold cannot be disposed inside the stage. In this case, a relatively large clamping mechanism that opens/closes and clamps the blow mold and/or bottom mold must be disposed on or above the stage.

SUMMARY

Several aspects of the invention may provide a blow molding device and a blow molding method that can implement a compact device, and can reduce cost.

According to one aspect of the invention, there is provided a blow molding device comprising:

a heating section that continuously transfers and heats a plurality of preforms that respectively include a neck along a heating transfer path while supporting the plurality of preforms using a plurality of transfer members in an inverted state in which the neck is positioned on a lower side;

a blow molding section that simultaneously blow-molds N (N is an integer equal to or larger than 2) preforms that have been heated by the heating section in an upright state in which the neck is positioned on an upper side to form N containers; and an intermittent transfer section that intermittently transfers the N preforms from the heating section to the blow molding section, the intermittent transfer section including:

a pitch conversion section that converts an arrangement pitch of the N preforms from a first pitch P1 in the heating section to a second pitch P2 (P2>P1) in the blow molding section; and an inversion section that includes N inversion arms that respectively invert the N preforms from the inverted state to the upright state.

According to one aspect of the invention, when the N preforms that have been continuously transferred and heated in the inverted state along the heating transfer path are intermittently transferred to the blow molding section by the intermittent transfer section, the pitch conversion section converts the pitch of the N preforms from the first pitch P1 (heating pitch) to the second pitch P2 (blow molding pitch), and the inversion section inverts the N preforms from the inverted state to the upright state. Since the transfer member that transfers the preform in the inverted state along the heating transfer path can hold the preform by utilizing the downward neck (opening) of the preform, the structure can be simplified, and the transfer operation is stabilized as compared with the case of holding the preform in the upright state. Since the majority of transfer members are transferred at the first pitch P1, simplification of the structure of the transfer member significantly contributes to a reduction in cost. In the blow molding section, the N preforms in the upright state are blow-molded. The number of transfer arms that transfer the N preforms in the upright state in the intermittent transfer section is significantly smaller than the number of transfer members in the heating section. Therefore, an increase in cost can be minimized even if the structure of the transfer arm becomes complex. Moreover, when the preform is blow-molded in the upright state, a blow core mold and a stretching rod having a relatively light weight, and a drive mechanism that drives the blow core mold and the stretching rod can be disposed above (over) the stage (i.e., the space inside the stage is not occupied). This makes it possible to dispose a heavy clamping mechanism inside the stage, for example.

In the blow molding device, the heating transfer path may include a linear transfer path in which the N preforms to be transferred to the intermittent transfer section are continuously transferred, and the inversion section may include a shaft that is parallel to the linear transfer path, and a swing arm that swings the N inversion arms around the shaft.

Since the N preforms transferred from the linear transfer path of the heating section are swung around the shaft that is parallel to the linear transfer path, the N preforms transferred from the heating section can be inverted while reducing the swing radius.

In the blow molding device, the pitch conversion section may be provided to the swing arm, and may convert a pitch of the N inversion arms from the first pitch P1 to the second pitch P2.

According to the above configuration, since the pitch conversion section is provided in the inversion section, the size of the device can be reduced as compared with the case of separately providing the inversion section and the pitch conversion section.

In the blow molding device, the pitch conversion section may convert the pitch of the N inversion arms while the swing arm swings.

According to the above configuration, the operation time can be reduced by performing the inversion operation and the pitch conversion operation in parallel.

In the blow molding device, the intermittent transfer section may further include:

N first transfer arms that intermittently carry out the N preforms from the heating transfer path along a first direction, and transfer the N preforms to the N inversion arms;

N second transfer arms that intermittently transfer the N preforms transferred from the N inversion arms to the blow molding section along the first direction; and a first drive source that intermittently drive the N first transfer arms and the N second transfer arms.

This makes it possible to continuously transfer the N preforms to the first transfer arms, the inversion arms, and the second transfer arms by driving the N first transfer arms and the N second transfer arms using the first drive source (single drive source).

In the blow molding device, the intermittent transfer section may further include:

a holding section that holds a free end of the N first transfer arms or the N second transfer arms when the N preforms are transferred between the N first transfer arms and the N inversion arms, and when the N preforms are transferred between the N second transfer arms and the N inversion arms; and a moving mechanism that moves the holding section between a holding position and a standby position, the holding section holding the free end of the N first transfer arms or the N second transfer arms when the holding section is set to the holding position, and not interfering with the swing arm when the holding section is set to the standby position.

Since the N first transfer arms and the N second transfer arms are in a cantilever state, the N preforms can be stably transferred to/from the N inversion arms by holding the free end of the N first transfer arms and the N second transfer arms using the holding section.

In the blow molding device, the heating transfer path may include an endless chain, and engagement sections that are formed on the endless chain at intervals of the N preforms, and the intermittent transfer section may further include:

a first rail that extends along the first direction;

a first slide member that moves along the first rail;

a second rail that is supported by the first slide member, and extends along a second direction that is perpendicular to the first direction;

a second slide member that supports the N second transfer arms, and moves along the second rail;

a third rail that is supported by the second slide member, and extends along the first direction;

a third slide member that supports the N first transfer arms, and moves along the third rail;

a second drive source that drives the second slide member along the second direction;

a first forward/backward drive section that is moved forward and backward to an engagement position with the engagement section of the chain and a non-engagement position, and drives the third slide member along the third rail to move the N first transfer arms together with the chain; and a second forward/backward drive section that drives the third slide member along the third rail by a distance by which the N first transfer arms have been moved by the first forward/backward drive section to return the N first transfer arms.

This makes it possible to receive the N preforms from the heating section while simultaneously driving the N first transfer arms and the N second transfer arms in the first direction and the second direction using the first drive source and the second drive source, and moving the N first transfer arms at the same speed as the chain independently of the N second transfer arms.

In the blow molding device, the blow molding section may include a primary blow molding section and a secondary blow molding section, the N second transfer arms may intermittently transfer the N preforms transferred from the N inversion arms to the primary blow molding section, and the intermittent transfer section may further include N third transfer arms that intermittently transfer N primary blow-molded articles that have been molded by the primary blow molding section to the secondary blow molding section using the drive source.

According to the above configuration, when implementing a blow molding device that molds a heat-resistant container using the primary blow molding section and the secondary blow molding section, the N preforms can be transferred from the heating section to the secondary blow molding section by continuously transferring the N preforms or containers in order of the first transfer arms, the inversion arms, the second transfer arms, and the third transfer arms by driving the N first transfer arms, the N second transfer arms, and the N third transfer arms using a single drive source.

The blow molding device may further comprise:

an ejection section that is adjacent to the secondary blow molding section, and removes N secondary blow-molded articles to outside of the blow molding device, the intermittent transfer section may further include N fourth transfer arms that intermittently transfer the N secondary blow-molded articles that have been molded by the secondary blow molding section to the ejection section using the drive source.

According to the above configuration, the N preforms or containers can be transferred from the heating section to the ejection section by continuously transferring the N preforms or containers in order of the first transfer arms, the inversion arms, the second transfer arms, the third transfer arms, and the fourth transfer arms by driving the N first transfer arms, the N second transfer arms, the N third transfer arms, and the N fourth transfer arms using a single drive source.

In the blow molding device, each of the plurality of preforms may include a body that follows the neck, and a bottom that closes the body, a diameter of the body being smaller on a side of the bottom than on a side of the neck, and the heating section may include a plurality of rod-like heaters that heat the body of each of the plurality of preforms, and are provided at a different height, the plurality of rod-like heaters may be provided along the heating transfer path, a rod-like heater among the plurality of rod-like heaters that is situated at a higher position being disposed closer to a centerline of the heating transfer path.

According to the above configuration, when the body of the preform is tapered toward the bottom, the body of the preform can be uniformly heated by disposing the rod-like heaters so that the distance between each rod-like heater and the body of the preform is identical. In this case, even if the preform falls from the transfer member, it is not likely that the preform in the inverted state comes in contact with the rod-like heater as compared with the case of transferring the preform in the upright state.

The blow molding device may further comprise:

a star wheel that rotates and supplies the plurality of preforms to the plurality of transfer members in the inverted state, the heating transfer path may include a first sprocket, a second sprocket, and an endless chain that is fitted around the first sprocket and the second sprocket, and the heating section may further include a push-up mechanism that pushes one of the plurality of transfer members upward along a line that connects a center of the star wheel and a center of the first sprocket, and inserts part of the transfer member into the neck of the preform in the inverted state.

According to the above configuration, when the preform supplied by the star wheel has been rotated to the position along the line that connects the center of the star wheel and the center of the first sprocket, the transfer member is pushed upward by the push-up mechanism. Therefore, the preform is held by the transfer member in a state in which part of the transfer member is inserted into the neck of the preform. This makes it unnecessary to dispose another star wheel coaxially with the first sprocket. As a result, a reduction in cost can be achieved due a decrease in the number of members.

In the blow molding device, each of the plurality of transfer members may include a rotation shaft, and a friction plate that is secured on the rotation shaft, and the heating section may include a contact section that comes in contact with the friction plate along the heating transfer path.

In this case, the structure can be significantly simplified, and the parts cost can be significantly reduced as compared with a related-art structure that causes a sprocket provided to the transfer member to engage a chain in order to rotate the preform.

According to another aspect of the invention, there is provided a blow molding method comprising:

a heating step that continuously transfers and heats a plurality of preforms that respectively include a neck along a heating transfer path while supporting the plurality of preforms using a plurality of transfer members in an inverted state in which the neck is positioned on a lower side;

a blow molding step that simultaneously blow-molds N (N is an integer equal to or larger than 2) preforms that have been heated by the heating step in an upright state in which the neck is positioned on an upper side to form N containers; and an intermittent transfer step that intermittently transfers the N preforms from a heating section to a blow molding section, the intermittent transfer step including:

a pitch conversion step that converts an arrangement pitch of the N preforms into from a first pitch P1 in the heating step to a second pitch P2 (P2>P1) in the blow molding step; and an inversion step that inverts the N preforms from the inverted state to the upright state.

The blow molding method can achieve advantageous effects equivalent to those achieved by the blow molding device.

BRIEF DESCRIPTION OF THE DRAWINGS

FIGS. 4A, 4B, and 4C are respectively a front view, a side view, and a plan view illustrating a chain.

FIGS. 5A and 5B are respectively a plan view and a front view illustrating an intermittent transfer section.

FIG. 15 is a plan view illustrating a pitch conversion section set to a second pitch P2.

FIGS. 16A to 16D are views illustrating a blow molding cycle of a blow molding section.

DESCRIPTION OF EXEMPLARY EMBODIMENTS

Exemplary embodiments of the invention are described in detail below with reference to a comparative example. Note that the following exemplary embodiments do not in any way limit the scope of the invention defined by the claims laid out herein. Note also that all of the elements described in connection with the following exemplary embodiments should not necessarily be taken as essential elements of the invention.

1. Outline of Blow Molding Device

Figure 1:
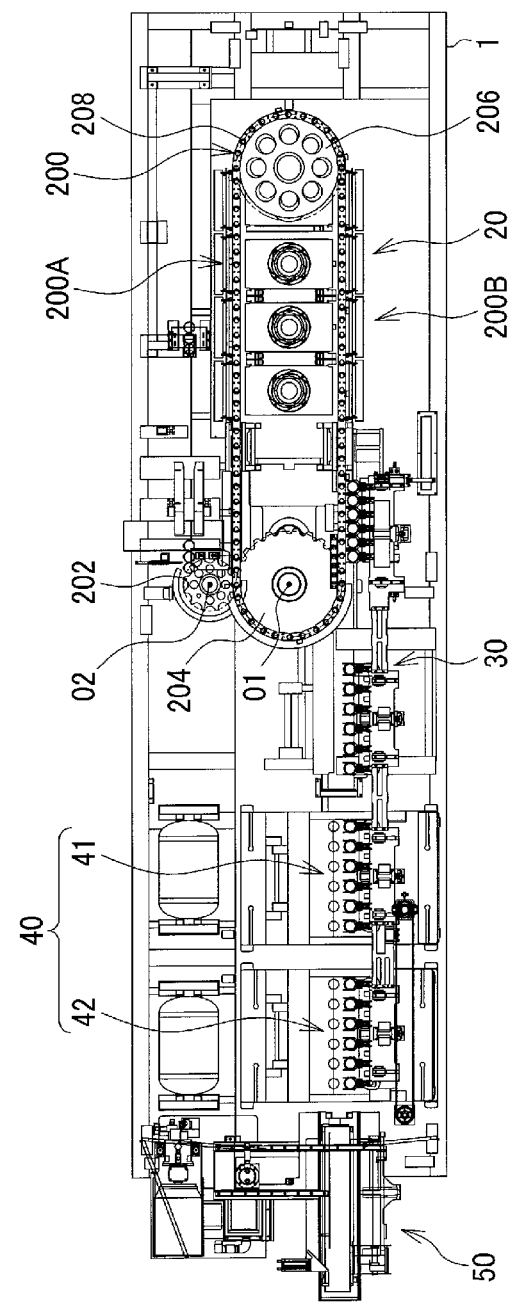
FIG. 1 is a plan view illustrating a blow molding device.
Figure 2:
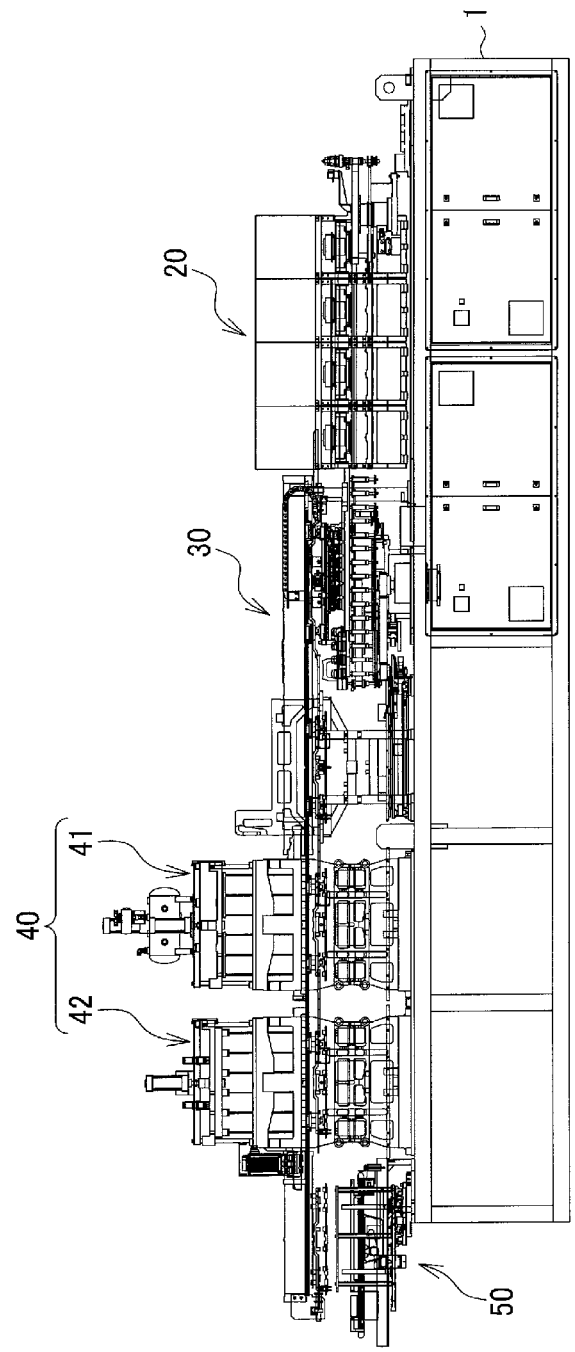
FIG. 2 is a front view illustrating a blow molding device.

FIG. 1 is a plan view illustrating a blow molding device, and FIG. 2 is a front view illustrating the blow molding device. As illustrated in FIGS. 1 and 2, a heating section 20, an intermittent transfer section 30, and a blow molding section 40 are provided on a stage 1 of the blow molding device.

Several embodiments of the invention relate to a blow molding device that molds a heat-resistant wide-mouth container. For example, a container having a neck outer diameter of 43 mm or more is referred to as "wide-mouth container". A preform used to blow-mold a wide-mouth container is referred to as "wide-mouth preform".

Figure 3:
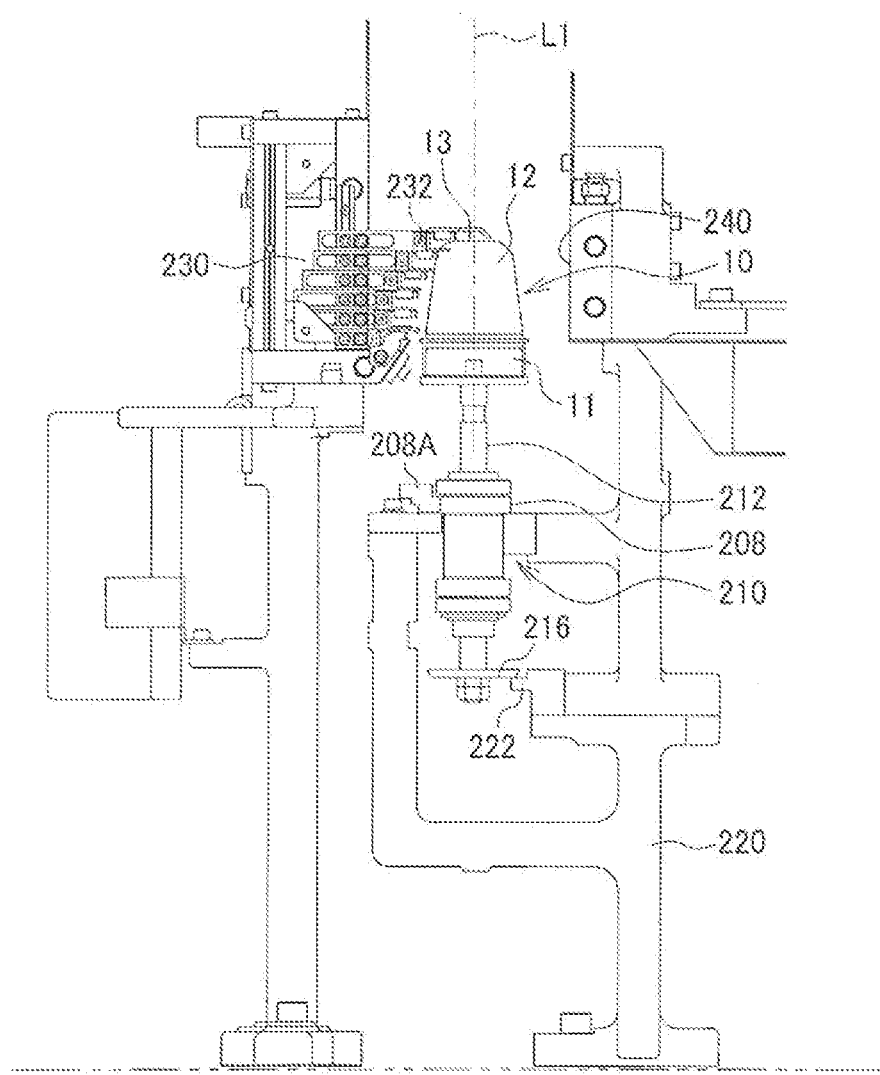
FIG. 3 is a cross-sectional view illustrating a heating section.

As illustrated in FIG. 3, the heating section 10 continuously transfers a body 12 of a wide-mouth preform 10 (i.e., preform) that includes a neck 11 along an endless heating transfer path 200 (see FIG. 1) in an inverted state in which the neck 11 is positioned on the lower side. The blow molding section 40 simultaneously blow-molds N (N is an integer equal to or larger than 2 (N=6 in one embodiment)) preforms 10 into a container in an upright state in which the neck 11 is positioned on the upper side. The intermittent transfer section 30 intermittently transfers N preforms from the heating section 20 to the blow molding section 40.

When molding a heat-resistant container, the blow molding section 40 may include a primary blow molding section 41 and a secondary blow molding section 42. The primary blow molding section 41 subjects N preforms 10 in the upright state to primary blow molding to form N primary blow-molded articles, and heats the N primary blow-molded articles using a heated primary blow cavity mold. The N primary blow-molded articles that have been removed from the primary blow cavity mold and have shrunk are subjected to secondary blow molding by the secondary blow molding section 42 in the upright state, and heated using a heated secondary blow mold to form N final molded articles (secondary blow-molded articles) that exhibit heat resistance. An ejection section 50 that removes the N final molded articles in the upright state may also be provided on the stage 1.

2. Heating Section

In the heating section 20, the preform 10 that is transferred in the inverted state along a shooter (not illustrated in the drawings) is continuously transferred to the heating transfer path 200 due to rotation of a star wheel (feed section) 202 (see FIG. 1). The heating transfer path 200 includes a chain 208 that is fitted around a first sprocket 204 and a second sprocket 206. As illustrated in FIG. 4A, a plurality of transfer members 210 that respectively support the preform 10 in the inverted state are secured on the chain 208 at a first pitch P1.

The transfer member 210 includes a holding member 214 that is provided at the upper end of a rotation shaft 212 that is rotatably supported by the chain 208, and inserted into the downward opening formed in the neck 11 of the preform 10, the preform being placed on the holding member 214. Since the holding member 214 does not require an elastic member such as that provided to a holding member 343A of an inversion arm 343 described later, the structure of the holding member 214 is simplified. Therefore, the number of parts of each of the plurality of transfer members 210 can be reduced, so that the parts cost can be reduced.

The upper end of the rotation shaft 212 may be a bolt 212A (see FIGS. 4A and 4B). In this case, the holding member 214 includes a nut that is attached to the bolt 212A. Alternatively, a nut hole for attaching a bolt may be formed in the upper end of the rotation shaft 212, and the holding member 214 may be attached to the rotation shaft 212 using the bolt 212A. Therefore, when molding the preform 10 that differs in the size of the neck 11, the holding member 214 can be exchanged corresponding to the size of the neck 11, and attached to the rotation shaft 212.

The transfer member 210 is configured so that a rotation disc (friction plate) 216 is secured on the lower end of the rotation shaft 212. The disc 216 is a substitute for a sprocket that is normally used. As illustrated in FIGS. 4B and 4C, engagement sections 208A protrude from the chain 208 at intervals of N (=6) transfer members 210.

The heating transfer path 200 includes an upstream-side first linear transfer path 200A and a downstream-side second linear transfer path 200B (see FIG. 1). The heating mechanism illustrated in FIG. 3 is disposed in the first linear transfer path 200A and the second linear transfer path 200B. The heating mechanism includes a heater section 230 and reflector section 240 that are provided on a frame 220, and disposed on either side of a centerline L1 of the heating transfer path 200. The heater section 230 includes a plurality of rod-like heaters 232 that heat the body 12 of the preform 10, and are provided at a different height. A contact section 222 that comes in contact with the lower side of the disc 216 of the transfer member 210 is formed on the frame 220. When the transfer member 210 that holds the preform 10 is transferred by the chain 208 in the direction perpendicular to the sheet of FIG. 3, the disc 216 (i.e., friction plate) that is transferred together with the transfer member 210 comes in frictional contact with the contact section 222. A rotational force is thus applied to the disc 216 from the contact section 222, and the rotation shaft 212 that is rotatably supported by the chain 208 is rotated. The preform 10 is thus rotated. The preform is normally rotated by allowing a sprocket provided to the transfer member to engage the chain that is stationary or driven. In contrast, the rotation structure according to one embodiment of the invention that includes the disk 216 and the contact section 222 has a simple configuration.

Radiant heat rays from the heater section 230 and heat rays obtained by reflecting the radiant heat rays using the reflector section 240 are applied to the preform 10 that is transferred along the heating transfer path 200 while being rotated, so that the entire body 12 of the preform 10 can be uniformly heated.

As illustrated in FIG. 3, the wide-mouth preform 10 includes a bottom 13 that closes the body that follows the neck 11, and the diameter of the body 12 is smaller on the side of the neck 11 than on the side of the bottom 13. Therefore, the heating section 20 is configured so that the rod-like heater 232 among the plurality of rod-like heaters 232 that is situated at a higher position is disposed closer to the centerline L1 of the heating transfer path 200.

In one embodiment of the invention, since the preform 10 is transferred in the inverted state, it is possible to prevent a situation in which the preform 10 fall offs, or is caught by the rod-like heater 232. If the preform 10 is transferred in the upright state in which the neck 11 is positioned on the upper side, the preform 10 that has fallen is necessarily caught by the rod-like heater 232 that is disposed close to the centerline L1. According to one embodiment of the invention, such as situation does not occur.

3. Intermittent Transfer Section

As illustrated in FIGS. 5A and 5B, the intermittent transfer section 30 includes N first transfer arms 301, N second transfer arms 302, N third transfer arms 303, and N fourth transfer arms 304 that move along an arm travel section 300. A drive pulley 306 that is rotated by a motor (first drive source) 305, and a driven pulley 307 are supported by the arm travel section 300, and a belt 308 is fitted around the drive pulley 306 and the driven pulley 307. A first slide member 309 that is secured on the belt 308 moves along the arm travel section 300, so that the N first transfer arms 301, the N second transfer arms 302, the N third transfer arms 303, and the N fourth transfer arms 304 supported by the first slide member 309 are simultaneously transferred by a distance L2 in an intermittent transfer direction (first direction).

The N first transfer arms 301 that receive the preform 10 from the heating section 20 are arranged at the first pitch P1 (heating pitch). The N second transfer arms 302, the N third transfer arms 303, and the N fourth transfer arms 304 that handle the preform 10, the primary blow-molded article, and the secondary blow-molded article in the blow molding section 40 are arranged at a second pitch P2 (blow molding pitch) that is larger than the first pitch P1. The N first transfer arms 301, the N second transfer arms 302, the N third transfer arms 303, and the N fourth transfer arms 304 can be moved forward and backward along a forward/backward direction (second direction) that is perpendicular to the intermittent transfer direction (first direction) by driving an air cylinder (second drive source) 330.

The support structure of the first to four transfer arms 301 to 304 is described below with reference to FIG. 6 (i.e., a partial enlarged view illustrating the first transfer arm 301 illustrated in FIG. 5B). The arm travel section 300 includes a linear guide 300A that functions as a first rail. The first slide member 309 that moves along the linear guide (first rail) 300A includes a linear bearing 309A that slides on the linear guide (first rail) 300A.

A second slide member 310 is supported by the first slide member 309. The first slide member 309 includes a linear guide (second rail) 309B that extends in the second direction (arm forward/backward direction) perpendicular to the first direction (direction along the distance L2 in FIG. 5A) in which the first slide member 309 slides. The second slide member 310 includes a linear bearing 310A that slides along the linear guide (second rail) 309B.

The air cylinder (second drive source) 330 that moves the second slide member 310 forward and backward is secured on the first slide member 309, and a rod (not illustrated in FIG. 6) of the air cylinder (second drive source) 330 is secured on the second slide member 310. The second slide member 310 moves along the linear guide (second rail) 309B by driving the air cylinder (second drive source) 330. The above support structure of the first transfer arm 301 is also applied to the second to fourth transfer arms 302 to 304.

As a configuration specific to the first transfer arm 301, a third slide member (arm support plate) 311 that supports the N first transfer arms 301 is disposed under the second slide member 310 of the first transfer arm 301. The rod of the air cylinder 330 moves the third slide member (arm support plate) 311 forward and backward together with the second slide member 310, so that the second slide members 310 that are provided with the N first transfer arms 301, the N second transfer arms 302, the N third transfer arms 303, and the N fourth transfer arms 304 simultaneously move forward and backward along the linear guide (second rail) 309B.

Figure 7:
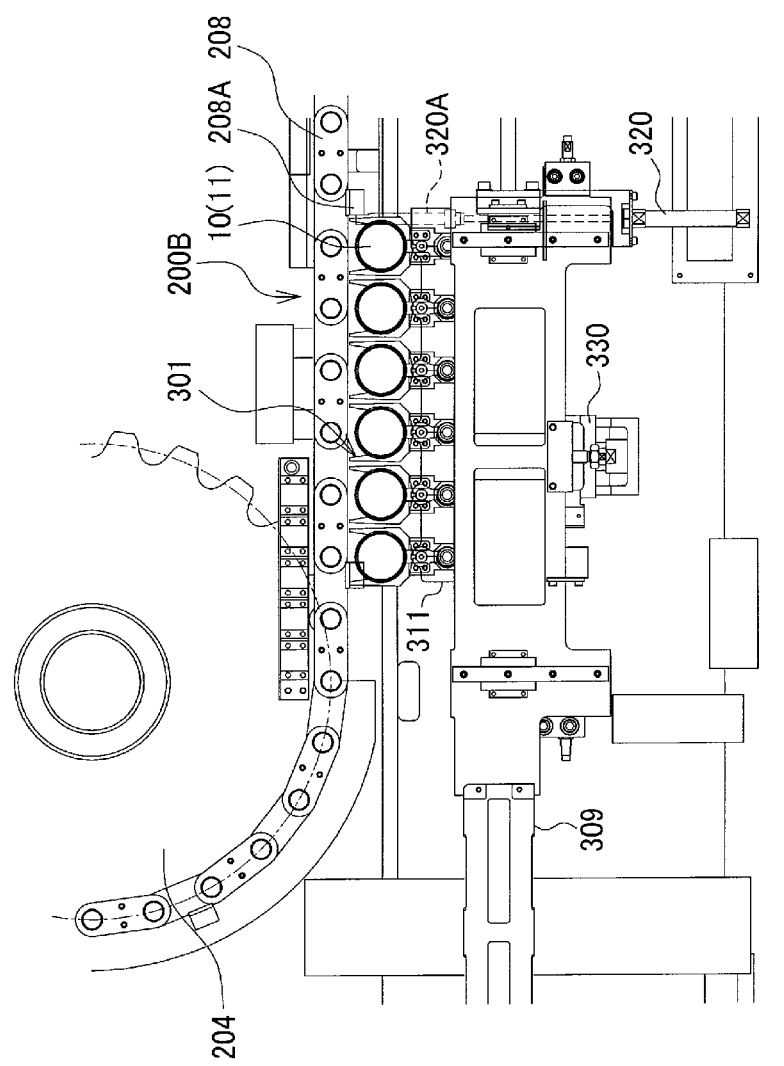
FIG. 7 is a plan view illustrating a first transfer arm of an intermittent transfer section.

As a configuration specific to the N first transfer arms 301, the N first transfer arms 301 can receive N preforms 10 from the heating section 20 when N preforms 10 are continuously transferred by the chain 208 (see FIG. 7). Therefore, the N first transfer arms 301 must move at the same speed as that of the chain 208. The first transfer arm 301 differs from the second to fourth transfer arms 302 to 304 as to this position.

In one embodiment of the invention, the N first transfer arms 301 can be moved with respect to the first slide member 309 by a distance L3 (see FIG. 5A) independently of the second to fourth transfer arms 302 to 304.

As illustrated in FIG. 7, a first air cylinder (first forward/backward drive section) 320 is mounted on the third slide member (arm support plate) 311 that is provided with the N first transfer arms 301. The first air cylinder 320 moves a rod 320A forward immediately before the engagement section 208A secured on the chain 208 reaches a given position. Therefore, the rod 320A engages the engagement section 208A (see FIG. 7). Accordingly, the third slide member (arm support plate) 311 can move by the distance L3 (see FIG. 5A) along with the movement of the chain 208.

When the third slide member (arm support plate) 311 has moved by the distance L3 (see FIG. 5A), the first air cylinder 320 moves the rod 320A backward to cancel the engagement with the engagement section 208A. Therefore, the third slide member (arm support plate) 311 moves only by the distance L3. The holding member 214 of the transfer member 210 (see FIG. 4A) is moved downward together with the rotation shaft 212 while the third slide member (arm support plate) 311 moves by the distance L3, and the holding member 214 is removed from the neck 11 of the preform 10. Therefore, the preform 10 is transferred in a state in which the preform 10 is held by the first transfer arm 301.

In one embodiment of the invention, a third rail 310B is provided to the second slide member 310, and the third slide member (arm support plate) 311 that is provided with the first transfer arm 301 is movably supported by the third rail 310B. As illustrated in FIG. 6, the third rail (linear guide) 310B is disposed under the second slide member 310 that is supported by the first slide plate 309. A linear bearing 311A that slides along the third rail (linear guide) 310B is secured on the third slide member (arm support plate) 311. Specifically, only the first transfer arm 301 is mounted on the third slide member (arm support plate) 311, and can move by the distance L3 with respect to the first slide member 309, differing from the structure in which the second to fourth transfer arms 302 to 304 are supported by the second slide member (arm support plate) 310. Note that the arm support plate (310, 311) is slidably supported by the first slide member 309.

Figure 6:
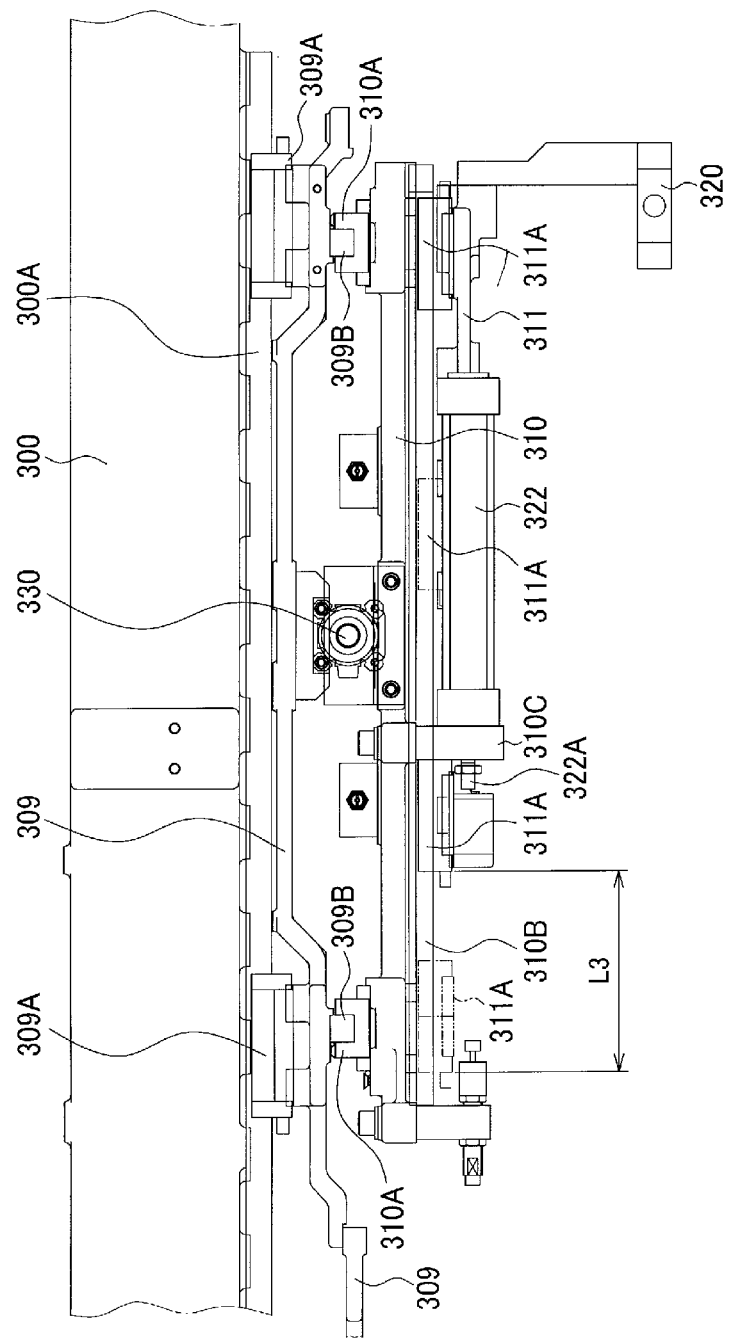
FIG. 6 is a partial enlarged view of FIG. 5B.

A second air cylinder (second forward/backward drive section) 322 is provided to move the arm support plate (second slide member) 311 provided with the first transfer arm 301 from the position indicated by the dot-dash line to the position indicated by the solid line in FIG. 6 with respect to the first slide member 309 (see also FIG. 5). As illustrated in FIG. 6, the second air cylinder 322 is secured on a cylinder securing plate 310C that is formed in the slide member 310.

The N first transfer arms 301, the N second transfer arms 302, the N third transfer arms 303, and the N fourth transfer arms 304 have the configuration illustrated in FIG. 7, and hold the neck 11 of the preform 10 between a pair of arms that are closed by a biasing member (e.g., spring). The neck 11 of the preform 10 can be held by (or removed from) the pair of arms due to the biasing force of the biasing member by moving the pair of arms forward or backward. The transfer arm illustrated in FIGS. 11 and 12 of JP-A-2010-149460 may be used as the first to fourth transfer arms 301 to 304, for example.

3.1. Inversion Section of Intermittent Transfer Section

Figure 8:
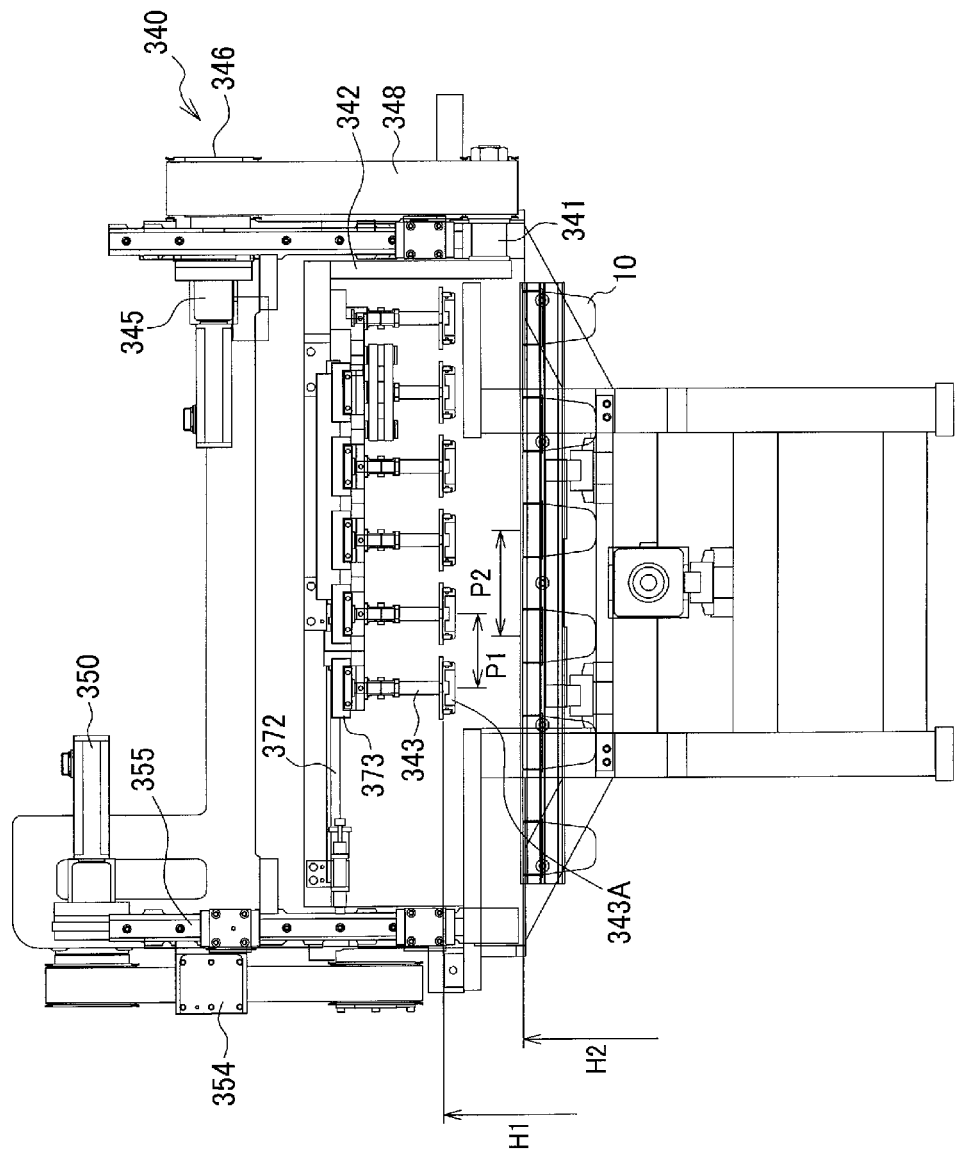
FIG. 8 is a front view illustrating an inversion section provided in an intermittent transfer section.

The intermittent transfer section 30 includes an inversion section 340 that inverts the N preforms 10 from the inverted state to the upright state when the first transfer arms 301 have moved forward by the distance L2 (see FIG. 5A) (see FIG. 8). As illustrated in FIG. 8, the inversion section 340 includes a shaft 341 that is parallel to the second linear transfer path 200B (see FIG. 2), a swing arm 342 that swings around the shaft 341, and is bent in the shape of a crank or the like, and N inversion arms 343 that are attached to the swing arm 342, and hold N preforms.

Figure 9:
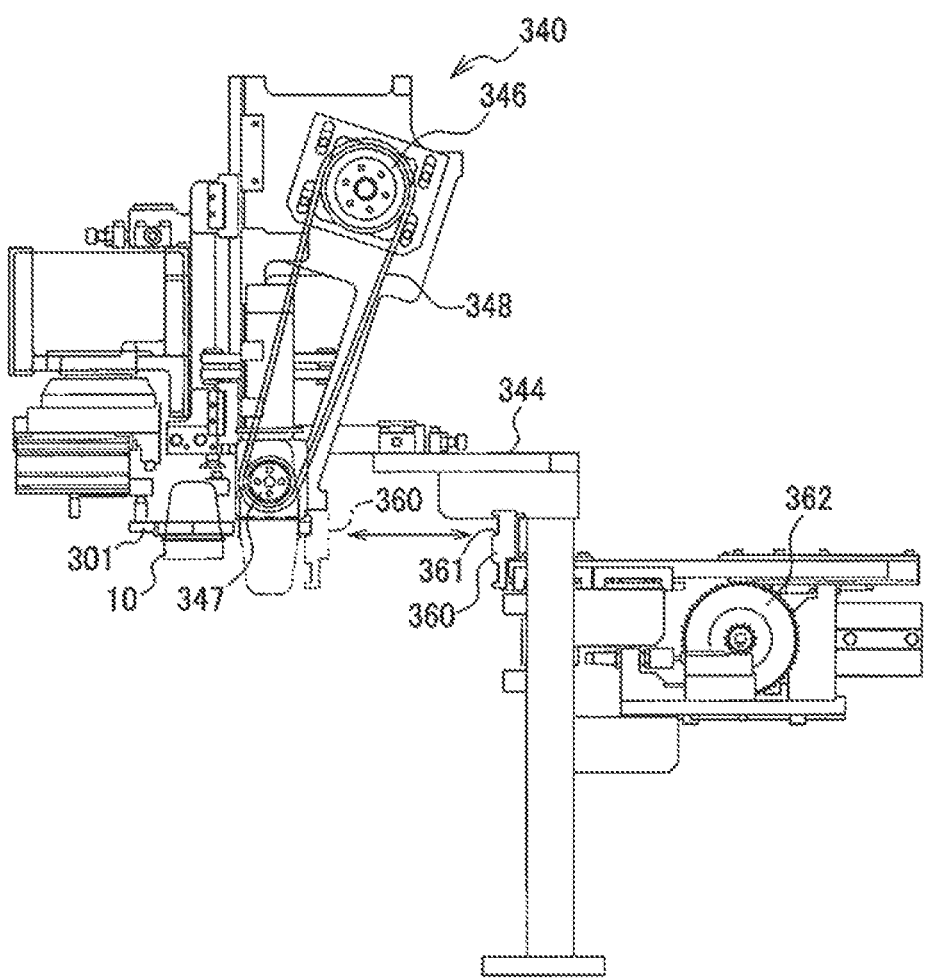
FIG. 9 is a right side view illustrating an inversion section.
Figure 10:
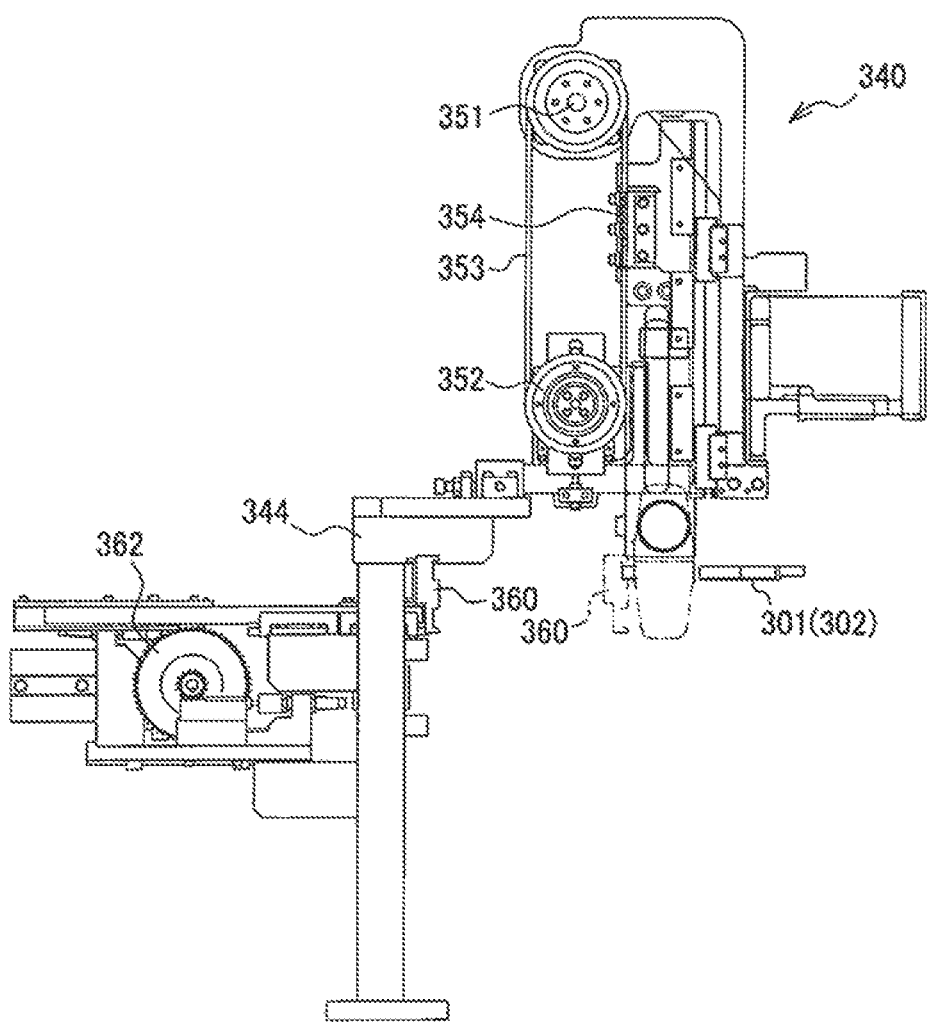
FIG. 10 is a left side view illustrating an inversion section.

As illustrated in FIGS. 9 and 10, the inversion section 340 is provided on a frame 344. An inversion motor 345 (see FIG. 8) is secured on the frame 344, and a belt 348 is fitted around a drive pulley 346 that is driven by the motor 345 and a driven pulley 347 that is secured on the shaft 341 (see FIG. 9). The swing arm 342 is rotated together with the shaft 341 when the motor 345 is driven. FIG. 8 illustrates a state in which the preform 10 has been inverted from the inverted state to the upright state, and transferred from the inversion arm 343 to the second transfer arm 302.

The inversion arm 343 includes a holding member 343A that is provided at the end of the inversion arm 343, and elastically inserted into the opening formed in the neck 11 of the preform 10 (see FIG. 8). The holding member illustrated in FIGS. 1 to 7 of JP-A-2010-149460 may be used as the holding member 343A, for example.

The inversion arm 343 can be moved upward and downward between a turn position H1 of the holding member 343A (see FIG. 8), and a position H2 at which the holding member 343A can be inserted into the neck 11 of the preform 10 (see FIG. 8). An elevation motor 350 (see FIG. 8) is secured on the frame 344. As illustrated in FIG. 9, a belt 353 is fitted around a drive pulley 351 driven by the motor 350 and a driven pulley 352. The inversion arm 343 can be moved upward and downward with respect to the swing arm 342 due to the movement of a stationary section 354 that is provided to the belt 353.

FIGS. 9 and 10 illustrate a holding section 360 that temporarily holds the free end of the first transfer arm 301 when the first transfer arm 301 is moved forward, and transfers the preform 10 to the inversion arm 343 in the inverted state. The holding section 360 is formed to have a shape appropriate for supporting the free end of the first transfer arm 301 that has moved forward. In one embodiment of the invention, the holding section 360 has a support groove 361 (see FIG. 9). The holding section 360 is driven by a forward/backward drive mechanism 362 that includes a rack & pinion mechanism or the like.

Figure 11:
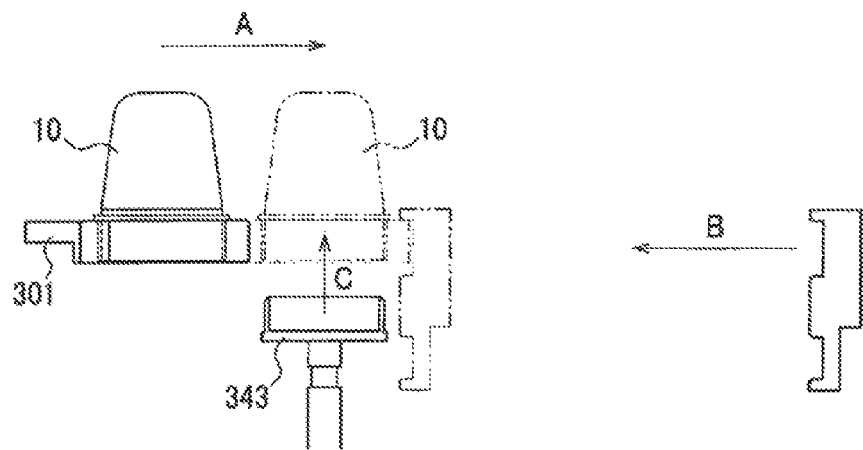
FIG. 11 is a view illustrating an operation that transfers a preform in an inverted state from a first transfer arm to an inversion arm.
Figure 12:
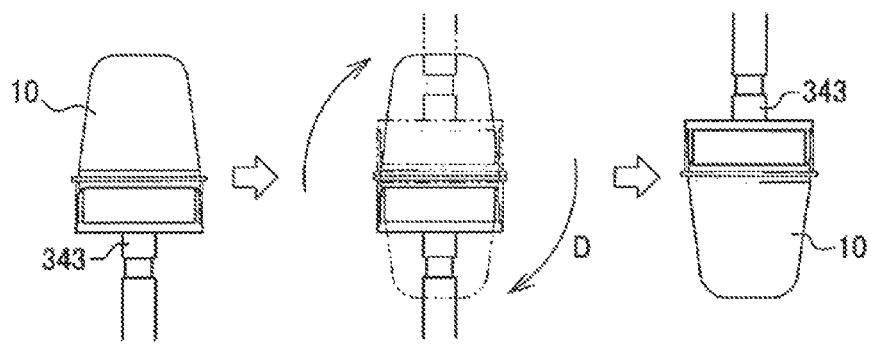
FIG. 12 is a view illustrating an operation that inverts a preform using an inversion arm.
Figure 13:
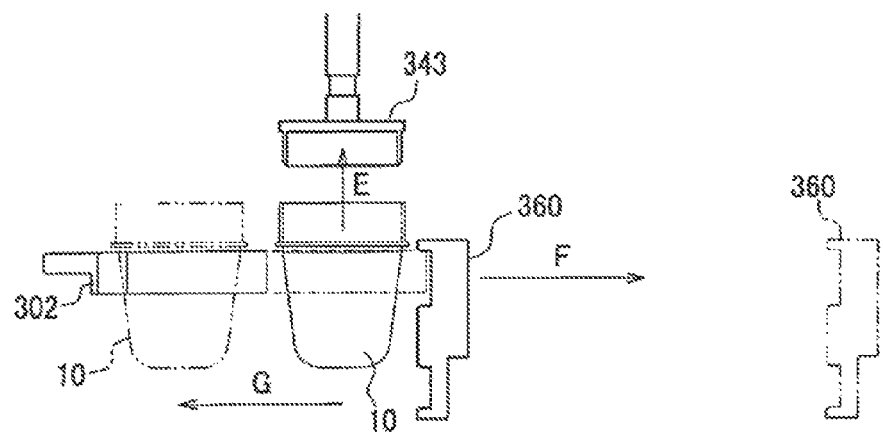
FIG. 13 is a view illustrating an operation that transfers a preform in an upright state from an inversion arm to a second transfer arm.

FIGS. 11 to 13 illustrate an operation that inverts the preform 10 from the inverted state to the upright state. In FIG. 11, the preform 10 in the inverted state that is supported by the first transfer arm 301 is moved forward in the direction A, and the holding member 360 is moved in the direction B to hold the free end of the first transfer arm 301. The inversion arm 343 is then moved upward in the direction C to hold the preform 10. The inversion arm 343 can be inverted when the first transfer arm 301 and the holding section 360 have been returned.

FIG. 12 illustrates an inversion operation. The preform 10 is inverted from the inverted state to the upright state by inverting the inversion arm 343 by 180 degrees in the D direction, for example. The position of the neck 11 of the preform 10 in the upright state is higher than the position of the neck 11 of the preform 10 in the inverted state. However, the difference in height is small. This is because the swing arm 342 that is bent in the shape of a crank is used. The difference in height can be absorbed by the elevation mechanism for the inversion arm 343.

FIG. 13 illustrates an operation that transfers the preform 10 from the inversion arm 343 to the second transfer arm 302. The second transfer arm 302 holds the neck 11 of the preform 10 in the upright state, and the inversion arm 343 is moved upward in the direction E while the holding section 360 holds the free end of the second transfer arm 302. The holding section 360 is then moved in the direction F, and the second transfer arm 302 is moved backward in the direction G to complete the transfer operation. The first to fourth transfer arms 301 to 304 can then be simultaneously moved by the distance L2.

3.2. Pitch Conversion Section

Figure 14:
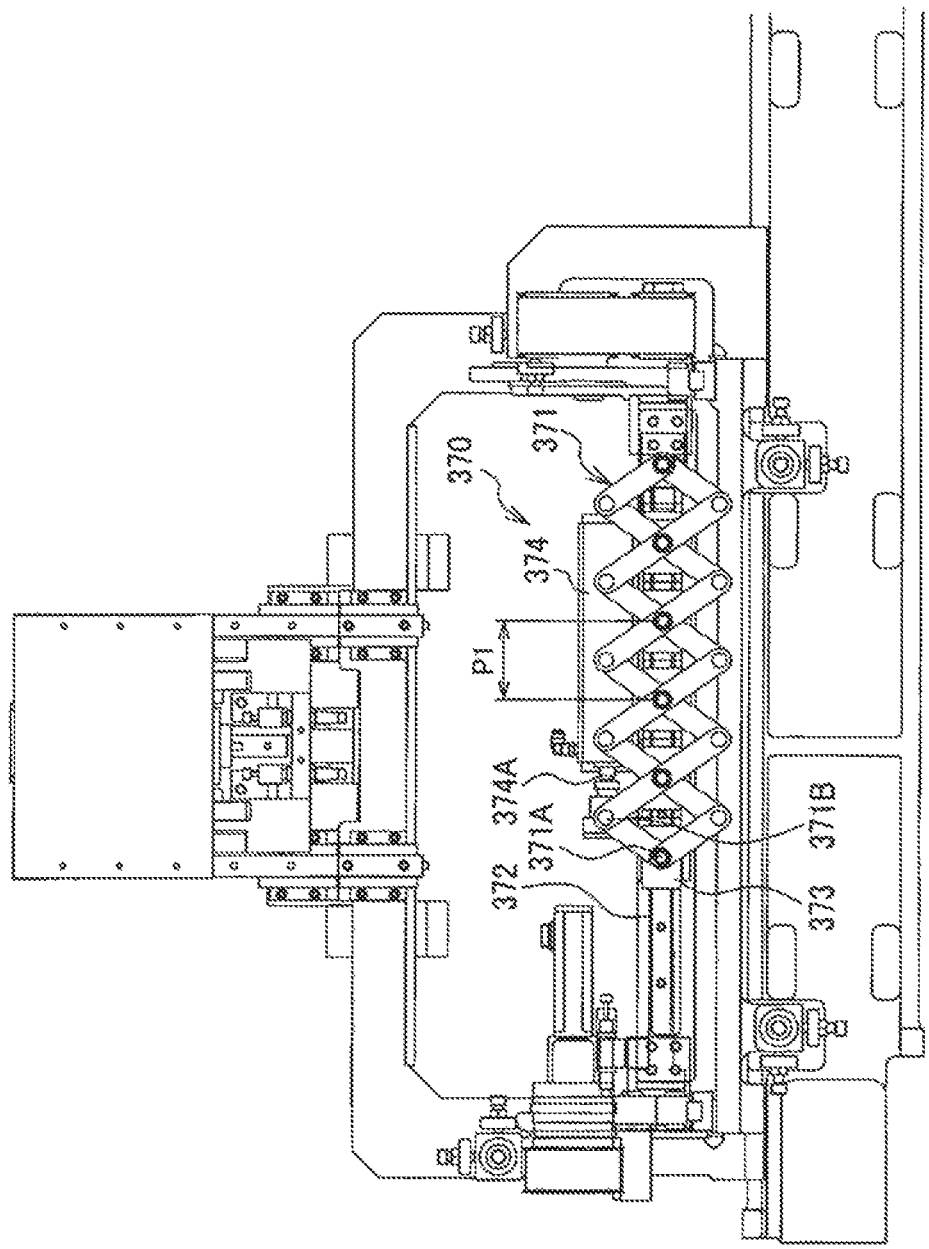
FIG. 14 is a plan view illustrating a pitch conversion section set to a first pitch P1.

FIGS. 14 and 15 illustrate a pitch conversion section 370 that is provided in the intermittent transfer section 30. In one embodiment of the invention, the pitch conversion section 370 is provided to the inversion section 340. Note that another configuration may also be employed. The pitch conversion section 370 may include a parallel link mechanism 371 (e.g., pantograph (magic hand)).

The N inversion arms 343 illustrated in FIG. 8 are secured on N sliders 373 that can slide along a linear guide 372 secured on the swing arm 342. A fulcrum 371A of the parallel link mechanism 371 is provided to each of the N sliders 373. An air cylinder 374 is secured on the swing arm 372. A fulcrum 371B of the link connected to the fulcrum 371A of the slider 372 positioned on the outermost end is secured on a rod 374A that is moved forward and backward using the air cylinder 374. Therefore, the pitch of the sliders 373 and the inversion arms 343 can be converted to the first pitch P1 illustrated in FIG. 14 or the second pitch P2 illustrated in FIG. 15 by driving the air cylinder 374. The pitch conversion operation can be performed when the inversion arm 343 supports the preform 10. In one embodiment of the invention, the pitch conversion operation is performed during the inversion operation in which the swing arm 342 swings. This makes it possible to absorb the pitch conversion time by the inversion operation time.

4. Blow Molding Section 4.1. Blow Molding Cycle

FIGS. 16A to 16D illustrate the blow molding cycle of the primary blow molding section 41 of the blow molding section 40. FIG. 16A illustrates a state in which the preform 10 has been transferred to the primary blow molding section 41 using the second transfer arm 302. A blow core 400 is set to an escape position in this state. The preform 10 in the upright state is transferred to the primary blow molding position in the forward direction in FIG. 16A in a state in which the neck 11 of the preform 10 is chucked by the second transfer arm 302. N preforms 10 that are simultaneously subjected to blow molding are transferred to the primary blow molding position using N second transfer arms 302.

FIG. 16B illustrates a state in which a pair of blow cavity split molds 401 and 402 and an optional bottom mold 403 are clamped after the preform 10 has been transferred to the primary blow molding position using the second transfer arm 302. In this case, the blow core 400 may be set at a standby position illustrated in FIG. 16B that is lower than the escape position illustrated in FIG. 16A.

FIG. 16C illustrates a state in which the second transfer arm 302 is removed from the neck 11 of the preform 10 supported by the clamped blow cavity split molds 401 and 402. In this case, the blow core 400 is set to the standby position in the same manner as in FIG. 16B.

FIG. 16D illustrates a state in which the blow core 400 is set to the lower-limit position, and seals the neck 11. A primary blow-molded article is then blow-molded from the preform 10 by blowing air through the blow core 400, and linearly driving a stretching rod 404.

In FIGS. 16B and 16C, the blow core 400 may be set to a lower position as long as the second transfer arm 302 that holds the neck 11 of the preform 10 does not interfere with the blow core 400.

The third transfer arm 303 that holds the primary blow-molded article that has previously been formed by the primary blow molding section 41 transfers the primary blow-molded article to the secondary blow molding section 42 when the blow molding step illustrated in FIGS. 16A to 16D is performed. As illustrated in FIG. 16D, the third transfer arm 303 stands by in the primary blow molding section 41 before completion of the blow molding step.

When the blow molding step (see FIG. 16D) has completed, the blow core 400 is removed from the neck 11, and moved upward to the escape position. The third transfer arm 303 holds the neck 11 to support the primary blow-molded article, and the blow cavity split molds 401 and 402 and the optional bottom mold 403 are opened (see FIG. 16A). The primary blow-molded article is then transferred by the third transfer arm 303 to complete the blow molding cycle. The next blow molding cycle is then performed.

Although the blow molding cycle of the primary blow molding section 41 has been described above, the secondary blow molding section 42 that subjects the primary blow-molded article to secondary blow molding to form a secondary blow-molded article also repeats the blow molding cycle in the same manner as the primary blow molding section 41.

The secondary blow-molded article (final molded article) formed by the secondary blow molding section 42 is transferred from the secondary blow molding section 42 to the ejection section 50 using the fourth transfer arm 304. The ejection section 50 removes the final molded article from the fourth transfer arm 304, and transfers the final molded article to the outside of the device.

4.2. Clamping Mechanism

Figure 17:
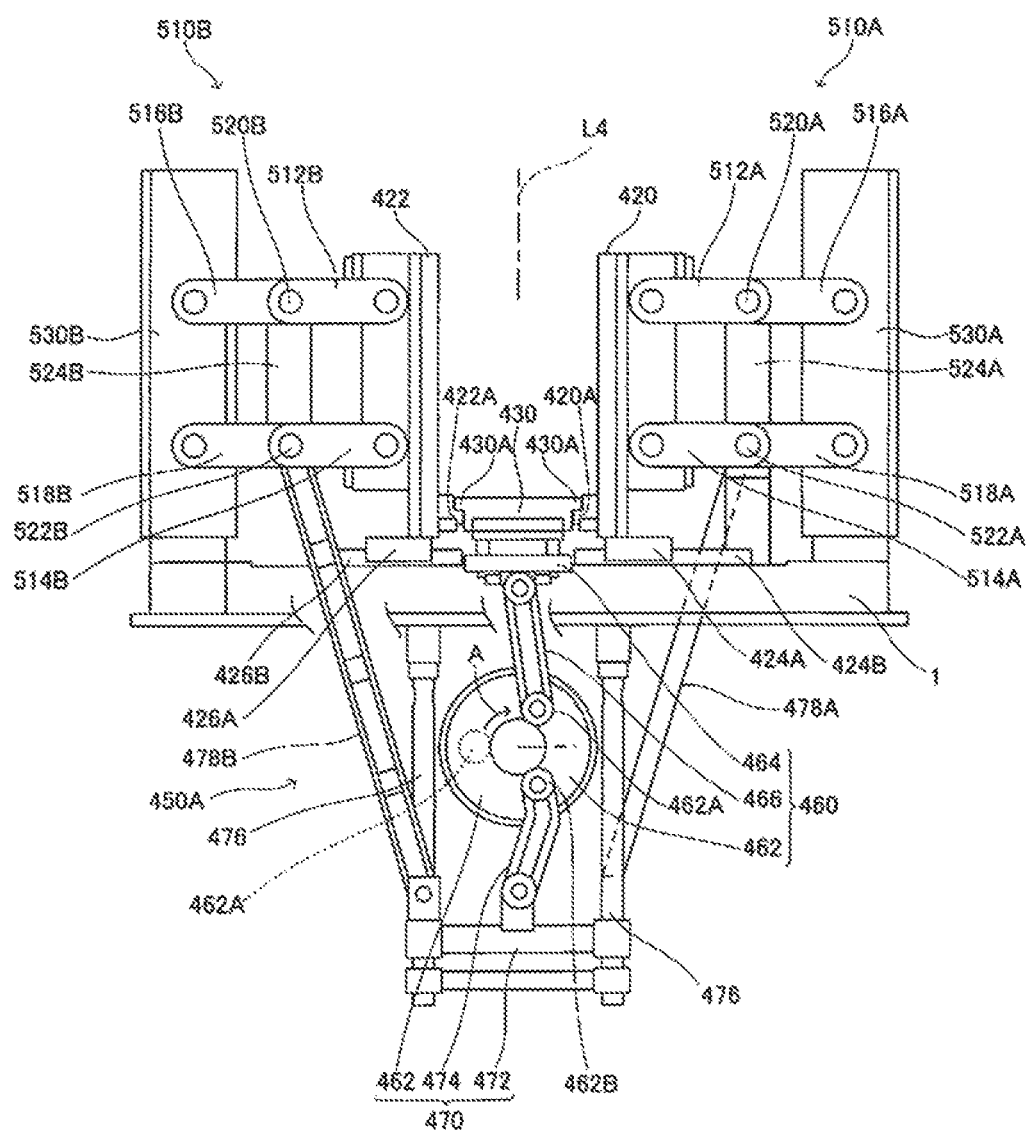
FIG. 17 is a view illustrating a clamping mechanism of a blow molding section.

The clamping mechanism can be placed in the stage 1 by molding the preform 10 in the upright state as described above. The clamping mechanism disclosed in JP-A-2009-126129 may be used as the clamping mechanism, for example. FIG. 17 illustrates the clamping mechanism of the primary blow molding section 41. Note that the clamping mechanism illustrated in FIG. 17 may also be applied to the secondary blow molding section 42.

As illustrated in FIG. 17, blow cavity mold securing plates 420 and 422 and a bottom mold securing plate 430 are provided on the stage 1. The blow cavity split molds 401 and 402 (see FIG. 16) are secured on the blow cavity split mold securing plates 420 and 422. The bottom mold 403 (see FIG. 16) is secured on the bottom mold securing plate 430. Sliders 424A and 426A are secured on the lower end of the blow cavity split mold securing plates 420 and 422, and guides 424B and 426B that linearly guide the sliders 424A and 426A are secured on the stage 1. The bottom mold securing plate 430 includes pressure-receiving engagement members 430A that protrude in the widthwise direction. The blow cavity split mold securing plates 420 and 422 respectively include pressure-receiving members 420A and 422A that engage the pressure-receiving engagement members 430A during clamping illustrated in FIG. 17, and support the pressure-receiving engagement members 430A to receive the blow pressure.

Figure 18:
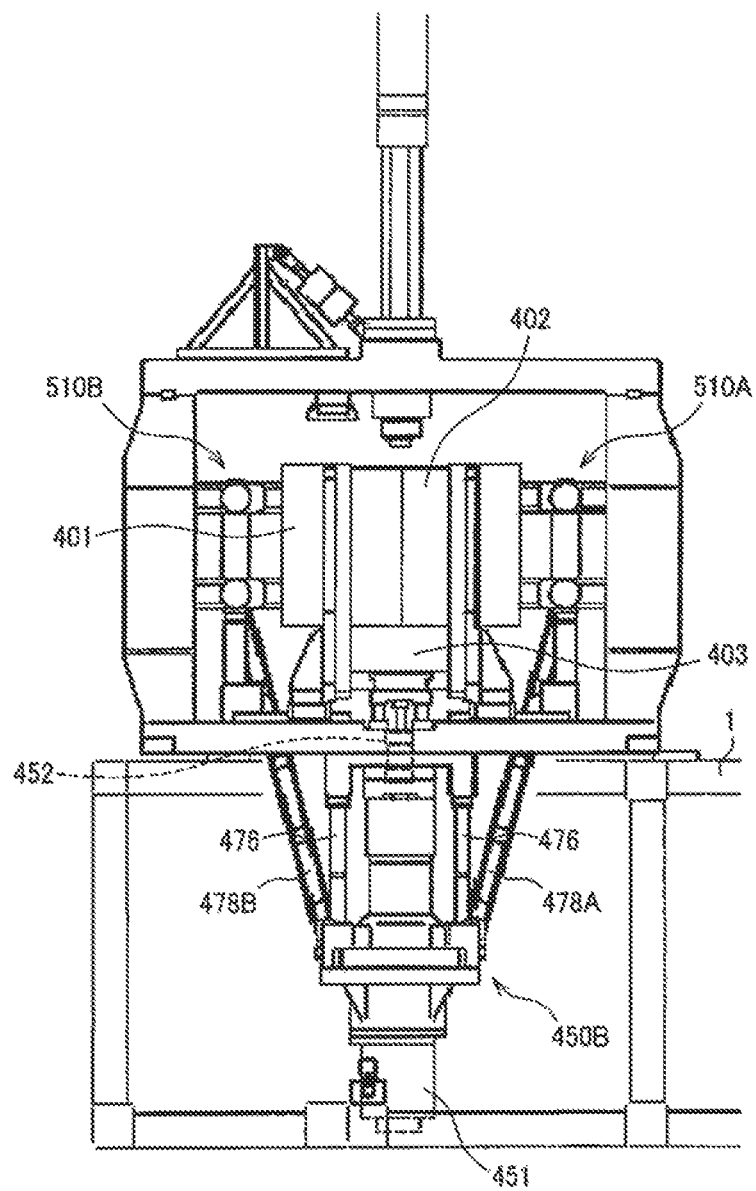
FIG. 18 is a view illustrating another example of a clamping mechanism of a blow molding section.

A clamping mechanism 450A is provided inside the stage 1 illustrated in FIG. 17. As illustrated in FIG. 18, the clamping mechanism 450A includes an air cylinder 452 that biases the bottom mold securing plate 430 toward the clamping position.

As illustrated in FIG. 17, the clamping mechanism 450A includes a first piston-crank mechanism 460 that drives the bottom mold securing plate 430, and a second piston-crank mechanism 470 that drives the blow cavity split mold securing plates 420 and 422. The first piston-crank mechanism 460 and the second piston-crank mechanism 470 share two turntable 462 (one of the turntables 462 is shown in FIG. 17) that is driven based on the driving force of a motor (not illustrated in the drawings). The output of the motor is decelerated by a decelerator, and transmitted to a rotary shaft. Two turntables 462 are secured on the rotary shaft. The clamping mechanism 450A includes two (i.e., at least one) toggle mechanisms 510A and 510B that respectively drive the blow cavity mold securing plates 420 and 422 based on the output of the second piston-crank mechanism 470.

The first piston-crank mechanism 460 includes the turntable 462, a bottom mold moving plate 464 that is guided linearly, and a first link 466, one end of the first link 466 being rotatably connected to a first position 462A of the turntable 462 that is shifted from the center of rotation, and the other end of the first link 466 being rotatably connected to the bottom mold moving plate 464.

The second piston-crank mechanism 470 that drives the toggle mechanisms 510A and 510B includes the turntable 462, a pulling member 472 that is guided linearly, and a second link 474, one end of the second link 474 being rotatably connected to a second position 462B of the turntable 462 that is shifted from the center of rotation, and the other end of the second link 474 being rotatably connected to the pulling member 472. The pulling member 472 is guided linearly along a plurality of guide rods 476 that are suspended from the stage 1.

The toggle mechanism 510A includes first and second toggle arms 512A and 514A that are rotatably supported by the blow cavity mold securing plate 420, and third and fourth toggle arms 516A and 518A that are rotatably supported by a first mold pressure-receiving member 530A secured on the stage 1. Shafts 520A and 522A that connect the first to fourth toggle arms 512A, 514A, 516A, and 518A are connected via a link arm 524A. A third link 478A is further provided, one end of the third link 478A being rotatably connected to the shaft 522A of the toggle mechanism 510A, and the other end of the third link 478A being rotatably connected to the pulling member 472.

The toggle mechanism 510B includes members 478B, 512B, 514B, 516B, 518B, 520B, and 522B having the same function as that of the corresponding member of the toggle mechanism 510A.

When the motor (not illustrated in the drawings) is rotated in the forward direction, the turntable 462 rotates in the clockwise direction A illustrated in FIG. 17, and the closing operation starts. The end of the first link 466 is situated at the position indicated by the dotted line in FIG. 17 when the closing operation starts, and the turntable 462 is rotated counterclockwise. Therefore, the bottom mold securing plate 430 and the bottom mold moving plate 464 that have been situated at a position lower than the position illustrated in FIG. 17 move upward. The pulling member 472 is situated at a position higher than the position illustrated in FIG. 17 when the closing operation starts. The pulling member 472 moves downward due to the rotation of the turntable 462 through the second link 474. When the pulling member 472 moves downward, the shafts 520A, 520B, 522A, and 522B move downward due to the third links 478A and 478B, so that the first to fourth toggle arms 512A to 518B (that form an angle around the shafts 520A, 520B, 522A, and 522B in the open state) are displaced and positioned linearly (clamped state) (see FIG. 17).

The blow cavity mold securing plates 420 and 422 and the bottom mold securing plate 430 are synchronously moved from the start of closing to clamping due to the functions of the first and second crank piston mechanisms 460 and 470 and the toggle mechanisms 510A and 510B. Note that the pressure-receiving members 420A and 422A engage the pressure-receiving engagement members 430A of the bottom mold securing plate 430 after the first piston-crank mechanism 460 has reached top dead center.

FIG. 18 illustrates a clamping mechanism 450B that does not utilize the first and second piston-crank mechanisms 460 and 470 illustrated in FIG. 17. When driving the toggle mechanisms 510A and 510B, the lower end of the third links 478A and 478B illustrated in FIG. 18 is moved linearly along the guide rods 476 using a ball screw (not illustrated in FIG. 18) that is driven by a motor 451, for example. In this case, the bottom mold 403 may be driven by an air cylinder 452 that is a drive source separated from the toggle mechanisms 510A and 510B. The blow cavity split molds 401 and 402 and the bottom mold 403 can be driven in synchronization by performing a sequence control process on the motor 451 and the air cylinder 452. In the example illustrated in FIG. 18, the clamping mechanism 450B can be provided inside the stage 1.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

For example, the invention may also be applied to a blow molding device that utilizes a preform other than a wide-mouth preform, and a blow molding device that molds a container other than a heat-resistant container.

A structure that continuously transfers the preform 10 that is transferred in the inverted state to the heating transfer path 200 due to rotation of the star wheel (feed section) 202 (see FIG. 1) is described below. The preform rotated by the star wheel 202 is normally transferred to a star wheel (not illustrated in FIG. 1) that is provided coaxially with the first sprocket 204 illustrated in FIG. 1.

In one embodiment of the invention, such a star wheel that is provided coaxially with the first sprocket 204 is omitted. Since a star wheel is a die member, the number of expensive members can be reduced by omitting one star wheel.

Figure 19:
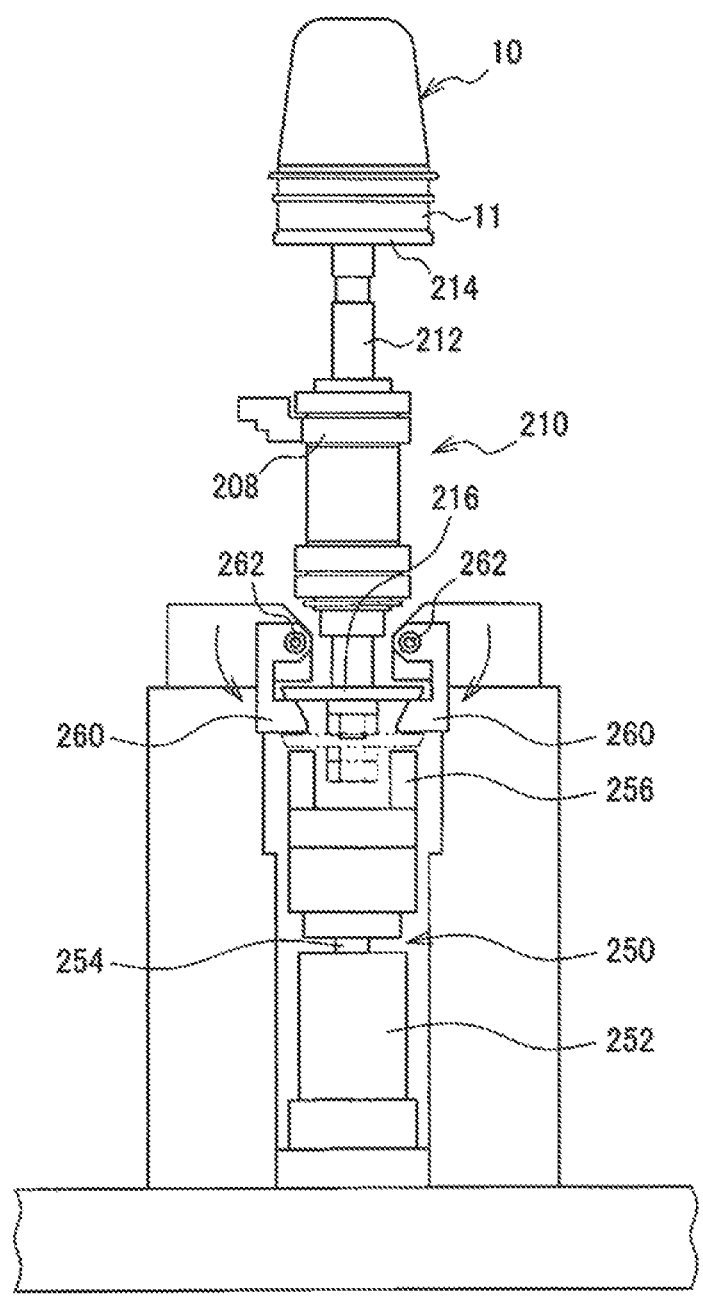
FIG. 19 is a side view illustrating a push-up mechanism that pushes a transfer member upward.

In one embodiment of the invention, a push-up mechanism 250 for the transfer member 210 illustrated in FIG. 19 is provided instead of a star wheel that is provided coaxially with the first sprocket 204. The push-up mechanism 250 pushes one of the plurality of transfer members 210 upward along a line that connects the center O1 of the first sprocket 204 and the center O2 of the star wheel 202 (see FIG. 1), and inserts part (holding member 214) of the transfer member 210 into the neck 11 of the preform 10 in the inverted state.

As illustrated in FIG. 19, the push-up mechanism 250 includes a push-up section 256 that is secured on a rod 254 that is moved forward and backward by the air cylinder 252, for example. The push-up section 256 pushes the disc 216 provided at the lower end of the transfer member 210 upward to move the entire transfer member 210 upward. The disc 216 is pushed upward from the position indicated by the dotted line to the position indicated by the solid line in FIG. 19, and the preform 10 is held by the transfer member 210.

The disc 216 that has been pushed upward by the push-up section 256 slides on the push-up section 256 when the transfer member 210 is transferred, and is locked by the contact section 222 illustrated in FIG. 3. The transfer member 210 can thus be maintained at the elevated position.

A movable contact section illustrated in FIG. 19 may be disposed on the upstream-side end of the contact section 222 illustrated in FIG. 3. In this case, the disc 216 that has been pushed upward by the push-up section 256 slides on the push-up section 256 when the transfer member 210 is transferred, and is guided to the contact section 222 illustrated in FIG. 3 via two movable contact sections 260 illustrated in FIG. 19.

The movable contact sections 260 are biased in the arrow direction (see FIG. 19) around a fulcrum 262 due to a biasing member (e.g., spring). If the disc 216 is insufficiently pushed upward by the push-up section 256, the movable contact sections 260 that interfere with the disc 216 rotate around the fulcrum 262 against the biasing force, so that the disc 216 can be guided to the normal position.

Figure 20:
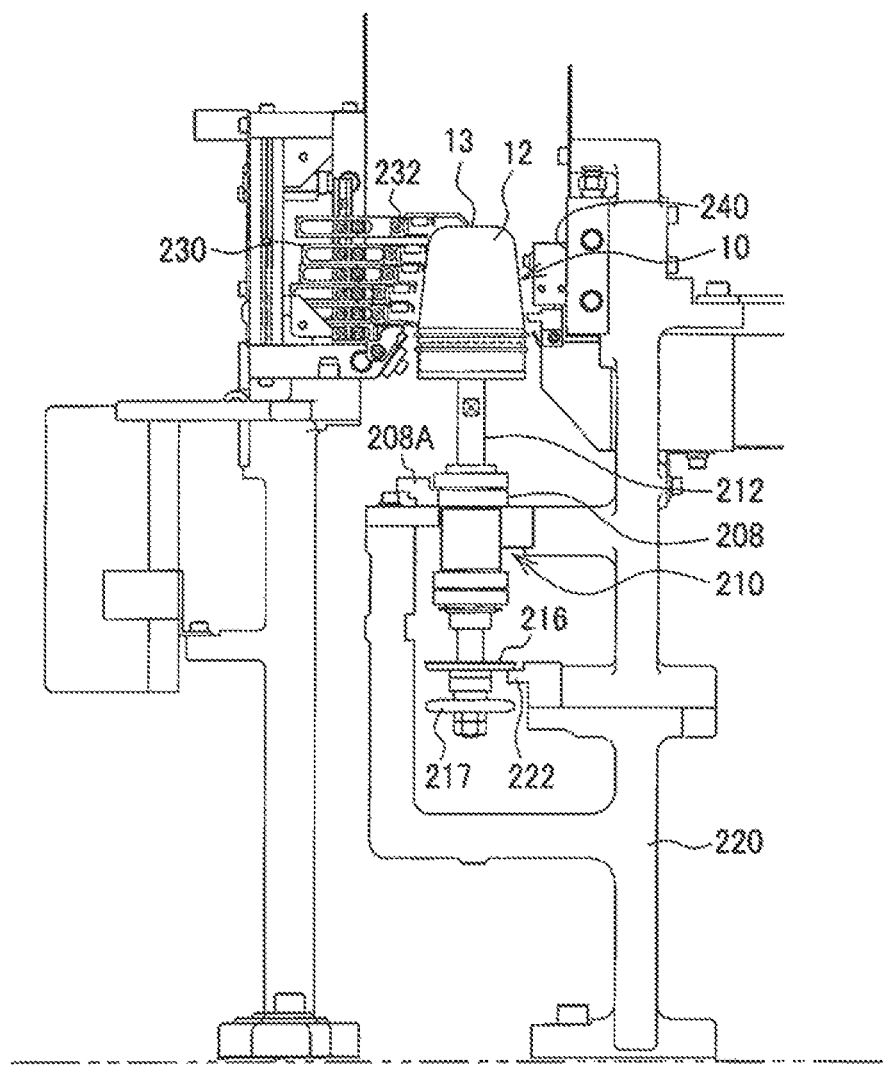
FIG. 20 is a cross-sectional view illustrating a heating section according to a modification in which a rotation sprocket is additionally provided.

A rotation sprocket may be added to the transfer member 210 illustrated in FIG. 3. As illustrated in FIG. 20, a rotation sprocket 217 may be secured under the friction plate 216 provided to the rotation shaft 212. In FIG. 3, the friction plate 216 is used as a rotation sprocket. In FIG. 20, the friction plate 216 functions only as a lower-limit stopper of the transfer member 210. The rotation sprocket 217 illustrated in FIG. 20 engages a chain (not illustrated in FIG. 20). A rotation force is applied to the rotation sprocket 217 of the transfer member 210 transferred by the chain 208 due to engagement with a stationary chain. Alternatively, the rotation sprocket 217 may be rotated in the same direction or the opposite direction by driving the chain that engages the rotation sprocket 217.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A blow molding device comprising:
   a heating section that continuously transfers and heats a plurality of preforms that respectively include a neck along a heating transfer path while supporting the plurality of preforms using a plurality of transfer members in an inverted state in which the neck is positioned on a lower side;
   a blow molding section that simultaneously blow-molds N, where N is an integer equal to or larger than two, preforms that have been heated by the heating section in an upright state in which the neck is positioned on an upper side to form N containers; and
   an intermittent transfer section that intermittently transfers the N preforms from the heating section to the blow molding section,
   wherein the intermittent transfer section includes:
   a pitch conversion section that converts an arrangement pitch of the N preforms from a first pitch P1 in the heating section to a second pitch P2 in the blow molding section, where second pitch P2 is greater than first pitch P1; and
   an inversion section that includes N inversion arms that respectively invert the N preforms from the inverted state to the upright state.

2. The blow molding device as defined in claim 1, wherein:
   the heating transfer path includes a linear transfer path in which the N preforms to be transferred to the intermittent transfer section are continuously transferred; and
   the inversion section includes a shaft that is parallel to the linear transfer path, and a swing arm that swings the N inversion arms around the shaft.

3. The blow molding device as defined in claim 2,
   wherein the pitch conversion section is provided to the swing arm, and converts a pitch of the N inversion arms from the first pitch P1 to the second pitch P2.

4. The blow molding device as defined in claim 3,
   wherein the pitch conversion section converts the pitch of the N inversion arms while the swing arm swings.

5. The blow molding device as defined in claim 1,
   wherein the intermittent transfer section further includes:
   N first transfer arms that intermittently carry out the N preforms from the heating transfer path along a first direction, and transfer the N preforms to the N inversion arms;
   N second transfer arms that intermittently transfer the N preforms transferred from the N inversion arms to the blow molding section along the first direction; and
   a first drive source that intermittently drive the N first transfer arms and the N second transfer arms.

6. The blow molding device as defined in claim 5,
   wherein the intermittent transfer section further includes:
   a holding section that holds a free end of the N first transfer arms or the N second transfer arms when the N preforms are transferred between the N first transfer arms and the N inversion arms, and when the N preforms are transferred between the N second transfer arms and the N inversion arms; and
   a moving mechanism that moves the holding section between a holding position and a standby position, the holding section holding the free end of the N first transfer arms or the N second transfer arms when the holding section is set to the holding position, and not interfering with the swing arm when the holding section is set to the standby position.

7. The blow molding device as defined in claim 5,
   wherein the heating transfer path includes an endless chain, and engagement sections that are formed on the endless chain at intervals of the N preforms, and
   wherein the intermittent transfer section further includes:
   a first rail that extends along the first direction;
   a first slide member that moves along the first rail;
   a second rail that is supported by the first slide member, and extends along a second direction that is perpendicular to the first direction;
   a second slide member that supports the N second transfer arms, and moves along the second rail;
   a third rail that is supported by the second slide member, and extends along the first direction;
   a third slide member that supports the N first transfer arms, and moves along the third rail;
   a second drive source that drives the second slide member along the second direction;
   a first forward/backward drive section that is moved forward and backward to an engagement position with the engagement section of the chain and a non-engagement position, and drives the third slide member along the third rail to move the N first transfer arms together with the chain; and
   a second forward/backward drive section that drives the third slide member along the third rail by a distance by which the N first transfer arms have been moved by the first forward/backward drive section to return the N first transfer arms.

8. The blow molding device as defined in claim 5, wherein:
   the blow molding section includes a primary blow molding section and a secondary blow molding section;
   the N second transfer arms intermittently transfer the N preforms transferred from the N inversion arms to the primary blow molding section; and
   the intermittent transfer section further includes N third transfer arms that intermittently transfer N primary blow-molded articles that have been molded by the primary blow molding section to the secondary blow molding section using the drive source.

9. The blow molding device as defined in claim 8, further comprising:
   an ejection section that is adjacent to the secondary blow molding section, and removes N secondary blow-molded articles to outside of the blow molding device,
   wherein the intermittent transfer section further includes N fourth transfer arms that intermittently transfer the N secondary blow-molded articles that have been molded by the secondary blow molding section to the ejection section using the drive source.

10. The blow molding device as defined in claim 1,
    wherein each of the plurality of preforms includes a body that follows the neck, and a bottom that closes the body, a diameter of the body being smaller on a side of the bottom than on a side of the neck, and
    wherein the heating section includes a plurality of rod-like heaters that heat the body of each of the plurality of preforms, and are provided at a different height, the plurality of rod-like heaters are provided along the heating transfer path, a rod-like heater among the plurality of rod-like heaters that is situated at a higher position is disposed closer to a centerline of the heating transfer path.

11. The blow molding device as defined in claim 1, further comprising:
- a star wheel that rotates and supplies the plurality of preforms to the plurality of transfer members in the inverted state,
- wherein the heating transfer path includes a first sprocket, a second sprocket, and an endless chain that is fitted around the first sprocket and the second sprocket, and
- wherein the heating section further includes a push-up mechanism that pushes one of the plurality of transfer members upward along a line that connects a center of the star wheel and a center of the first sprocket, and inserts part of the transfer member into the neck of the preform in the inverted state.

12. The blow molding device as defined in claim 1,
- wherein each of the plurality of transfer members includes a rotation shaft, and a friction plate that is secured on the rotation shaft, and
- wherein the heating section includes a contact section that comes in contact with the friction plate along the heating transfer path.

* * * * *